(12) United States Patent
Wu et al.

(10) Patent No.: US 10,135,133 B2
(45) Date of Patent: Nov. 20, 2018

(54) APPARATUS AND METHODS FOR REDUCING MUTUAL COUPLINGS IN AN ANTENNA ARRAY

(71) Applicant: The Chinese University of Hong Kong, Shatin (CN)

(72) Inventors: Ke-Li Wu, Shatin (CN); Changning Wei, Foshan (CN); Xide Mei, Sichuan (CN)

(73) Assignee: The Chinese University of Hong Kong, Shatin, N.T., Hong Kong (CN)

( * ) Notice: Subject to any disclaimer, the term of this patent is extended or adjusted under 35 U.S.C. 154(b) by 0 days.

(21) Appl. No.: 15/603,758

(22) Filed: May 24, 2017

(65) Prior Publication Data

US 2017/0346179 A1    Nov. 30, 2017

Related U.S. Application Data

(60) Provisional application No. 62/341,835, filed on May 26, 2016.

(51) Int. Cl.
*H01Q 7/04* (2006.01)
*H01Q 1/52* (2006.01)
(Continued)

(52) U.S. Cl.
CPC ............ *H01Q 1/523* (2013.01); *H01Q 21/062* (2013.01); *H01Q 21/065* (2013.01); *H01Q 21/22* (2013.01);
(Continued)

(58) Field of Classification Search
CPC ...... H01Q 1/523; H01Q 21/062; H01Q 21/22; H01Q 25/001; H04B 5/005; H04B 7/0413
(Continued)

(56) References Cited

U.S. PATENT DOCUMENTS 5,382,959 A    1/1995 Pett et al.
6,061,027 A    5/2000 Legay et al.
(Continued)

OTHER PUBLICATIONS

Allen et al., "Mutual Coupling in Array Antennas," Lincoln Laboratory, M.I.T., Lexington, MA, Tech. Rep. 424 (ESD-TR-66-443), 1966.

(Continued)

*Primary Examiner* — Huedung Mancuso
(74) *Attorney, Agent, or Firm* — Kilpatrick Townsend & Stockton LLP

(57) ABSTRACT

A device is presented for improving radio frequency (RF) and microwave array antenna performance. The device sits in the near field, the reactive region, of the antenna array with a pattern of electrically isolated rectangular, cross-shaped, ell, and/or similarly-shaped patches of flat metal or other conductor in a flat plane. The patches are segmented into smaller shapes no greater than 0.3 of a shortest wavelength of the nominal operating range of the antenna and/or the height of the plane is greater than 0.25 and/or less than 0.4 of the center frequency's wavelength. Mutual coupling S-parameters between neighboring elements are either simulated or measured, and the patch sizes or height are designed such that $|S_{21}^{Refl}|$ is in a range of $|S_{21}^{Array}| \pm 20\%$ of $|S_{21}^{Array}|$; and Phase($S_{21}^{Refl}$) is in a range of Phase$(S_{21}^{Array})+180\pm30$ degrees, where $S_{21}^{Array}$ is an S-parameter between antenna two neighboring antenna elements measured or simulated without the device, where $S_{21}^{ADS}$ is the same with the device, and $S_{21}^{Refl}=S_{21}^{ADS}-S_{21}^{Array}$.

31 Claims, 24 Drawing Sheets

(51) Int. Cl.
H01Q 21/06 (2006.01)
H01Q 21/22 (2006.01)
H01Q 25/00 (2006.01)
H04B 5/00 (2006.01)
H04B 7/0413 (2017.01)

(52) U.S. Cl.
CPC ........... *H01Q 25/001* (2013.01); *H04B 5/005* (2013.01); *H04B 7/0413* (2013.01)

(58) Field of Classification Search
USPC ........................................ 343/842
See application file for complete search history.

(56) References Cited

U.S. PATENT DOCUMENTS

| | | | | |
|---|---|---|---|---|
| 6,081,235 | A * | 6/2000 | Romanofsky | H01P 1/181 333/156 |
| 6,211,824 | B1 | 4/2001 | Holden et al. | |
| 6,946,995 | B2 | 9/2005 | Choi et al. | |
| 7,212,163 | B2 * | 5/2007 | Huang | H01Q 19/026 343/700 MS |
| 7,436,363 | B1 * | 10/2008 | Klein | H01Q 5/00 343/700 MS |
| 8,072,384 | B2 * | 12/2011 | Morrow | H01Q 21/0025 343/700 MS |
| 8,350,759 | B2 | 1/2013 | Ju et al. | |
| 8,633,866 | B2 | 1/2014 | Sarabandi et al. | |
| 8,681,064 | B2 | 3/2014 | Isom | |
| 9,715,007 | B2 * | 7/2017 | Lohoefener | G01S 7/03 |

OTHER PUBLICATIONS

Andersen et al., "Decoupling and descattering networks for antennas," IEEE Trans. Antennas Propag., vol. 24, No. 6, pp. 841-846, Nov. 1976.
Bamford, et al., "Minimising mutual coupling in thick substrate microstrip antenna arrays," Electron. Lett., vol. 33, No. 8, Apr. 1997.
Chen et al., "Effect of mutual coupling on the channel capacity of MIMO systems," IEEE Trans. Veh. Technol., vol. 65, No. 1, pp. 398-403, Jan. 2016.
Gou, et al., "A compact dual-polarized printed dipole antenna with high isolation for wideband base station applications," IEEE Trans. Antennas Propag., vol. 62, No. 8, pp. 4392-4395, Aug. 2014.
Janaswamy, "Effect of element mutual coupling on the capacity of fixed length linear arrays," IEEE Antennas Wireless Propag. Lett., vol. 1, pp. 157-160, 2002.
Marzetta, "Noncooperative cellular wireless with unlimited numbers of base station antennas," IEEE Trans. Wireless Commun., vol. 9, No. 11, pp. 3590-3600, Nov. 2010.
Masouros, et al., "Large-scale MIMO transmiters in fixed physical spaces: the effect of transmit correlation and mutual coupling," IEEE Trans. Commun., vol. 61, No. 7, pp. 2794-2804, Jul. 2013.
Ngo, et al., "Energy and spectral efficiency of very large multiuser MIMO systems," IEEE Trans. Commun., vol. 61, No. 4, pp. 1436-1449, Apr. 2013.
Peel, et al., "A vector-perturbation technique for near-capacity multiantenna multiuser communication—part I: channel inversion and regularization," in IEEE Trans. Communications, vol. 53, No. 1, pp. 195-202, Jan. 2005.
Pozar, "A relation between the active input impedance and the active element pattern of a phased array," IEEE Trans. Antennas Propag., vol. 51, No. 9, pp. 2486-2489, Sep. 2003.
Qian, et al., "An LTCC coupled resonator decoupling network for two antennas," IEEE Trans. Microwave Theory Tech., vol. 63, No. 10, pp. 3199-3207, Oct. 2015.
Rusek, et al., "Scaling up MIMO: Opportunities and challenges with very large arrays," IEEE Signal Process. Mag., vol. 30, No. 1, pp. 40-60, Jan. 2013.
Saenz et al., "Coupling Reduction Between Dipole Antenna Elements by using a Planar Meta-Surface," IEEE Transactions on Antennas and Propagation, vol. 57, No. 2, Feb. 2009, 383-394.
Savy et al., "Coupling effects in MIMO phased array," 2016 IEEE Radar Conference (RadarConf), May 2016, Philadelphia, USA, pp. 1-6.
Wallace et al., "Mutual coupling in MIMO wireless systems: A rigorous network theory analysis," IEEE Trans. Wireless Commun., vol. 3, No. 7, pp. 1317-1325, Jul. 2004.
Wang, et al., "Performance of the large-scale adaptive array antennas in the presence of mutual coupling," IEEE Trans. Antennas Propag., vol. 64, No. 6, pp. 2236-2245, Jun. 2016.
Yang, et al., "Microstrip antennas integrated with electromagnetic band-gap (EBG) structures: A low mutual coupling design for array applications," IEEE Trans. Antennas Propag., vol. 51, No. 10, pp. 2936-2946, Oct. 2003.
Yuan, et al., "Performance of adaptive array antenna with arbitrary geometry in the presence of mutual coupling," IEEE Trans. Antennas Propag., vol. 54, No. 7, pp. 1991-1996, Jul. 2006.
Zhao, et al., "A coupled resonator decoupling network for two-element compact antenna arrays in mobile terminals," IEEE Trans. Antennas Propag., vol. 62, No. 5, pp. 2767-2776, May 2014.
Zhao, et al., "A decoupling technique for four-element symmetric arrays with reactively loaded dummy elements," IEEE Trans. Antennas Propag., vol. 62, No. 8, pp. 4416-4421, Aug. 2014.
Press Release dated Feb. 25, 2016, "ZTE Unveils Pre5G UDN demo at MWC," downloaded Jun. 1, 2017 at http://mwc2016.zte.net/zte-unveils-pre5g-udn-demo-mwc/.

* cited by examiner

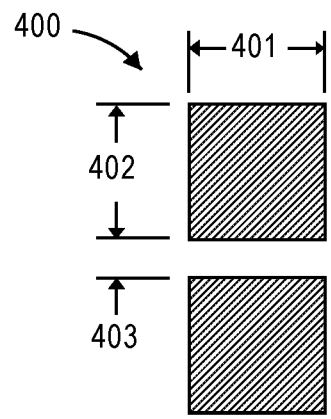
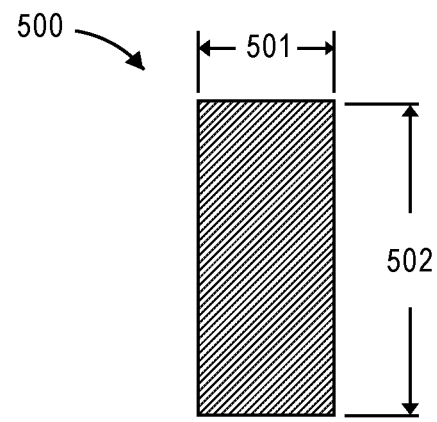
FIG. 4  FIG. 5
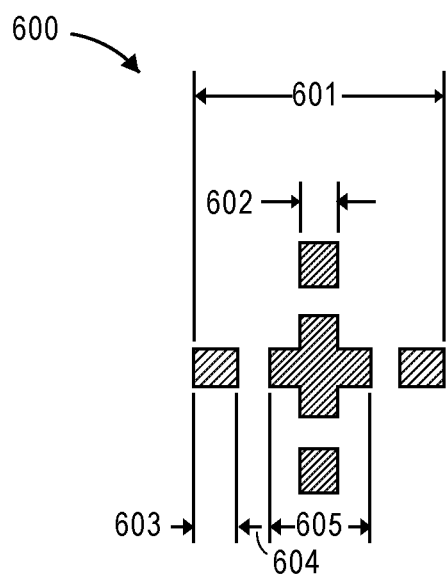
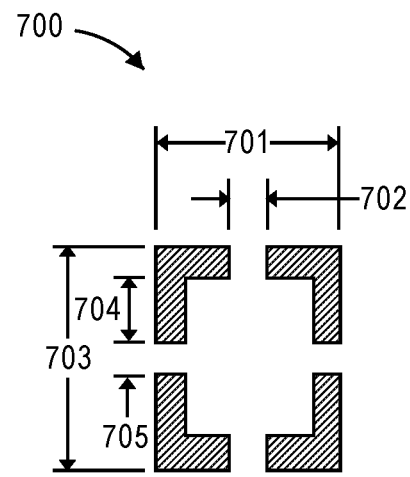
FIG. 6  FIG. 7

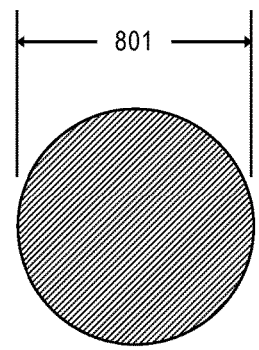
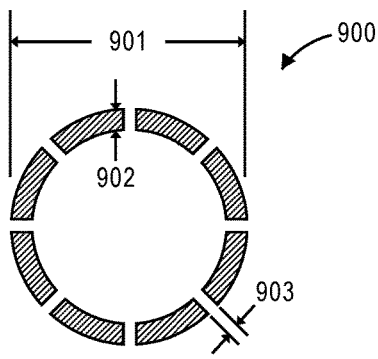
FIG. 8    FIG. 9
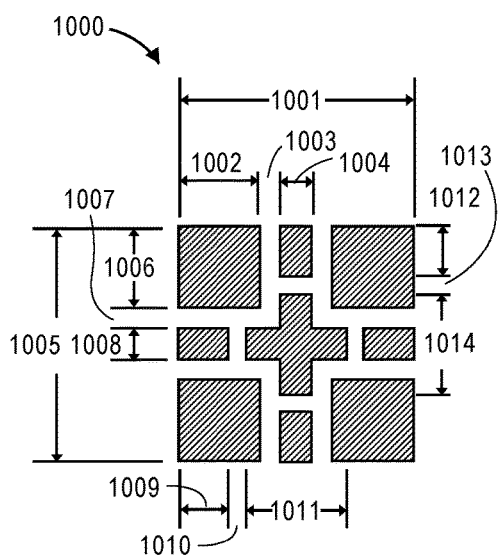
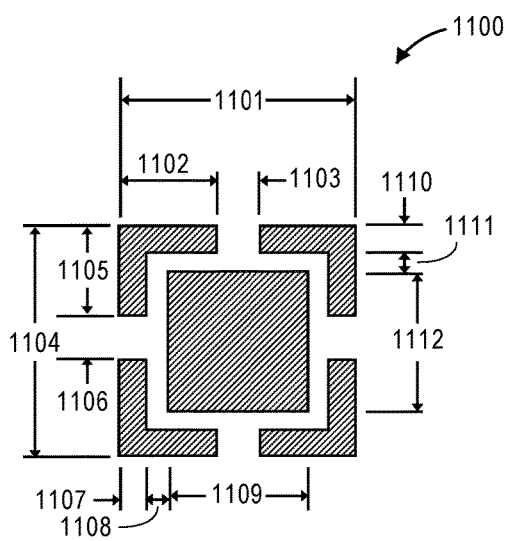
FIG. 10    FIG. 11

FIG. 16D  FIG. 16C

APPARATUS AND METHODS FOR REDUCING MUTUAL COUPLINGS IN AN ANTENNA ARRAY

CROSS-REFERENCE TO RELATED APPLICATIONS

This application claims the benefit of U.S. Provisional Application No. 62/341,835, filed May 26, 2016, the entire disclosure of which is incorporated by herein by reference.

STATEMENT AS TO RIGHTS TO INVENTIONS MADE UNDER FEDERALLY SPONSORED RESEARCH AND DEVELOPMENT

Not applicable.

TECHNICAL FIELD

The disclosure relates to antennas, in particular, to mutual coupling reduction in an antenna array, especially a multiple-input, multiple output (MIMO) antenna array, such as a massive-MIMO (M-MIMO) antenna array. It is similarly related to phased array antennas for radars and other applications.

BACKGROUND

It is apparent that the Massive-MIMO (M-MIMO) technology has become a key enabling technology for future wireless communication systems, particularly in the fifth generation (5G) wireless systems. M-MIMO represents a paradigm shift in the way of thinking with regards to antenna and signal processing theory and engineering. Basically, the more antennas an array is equipped with, the more degrees of freedom the propagation channel can have, and the better performance in terms of capacity and link reliability. However, the performance of M-MIMO systems strongly depend on the properties of the antenna array and the propagation environment. When the number of antennas increases within a constrained space, a designer may confront many challenges. Among these is the mutual coupling effect, which is a major limiting factor to the performance of an M-MIMO antenna array. In practice, how to decrease mutual couplings between every pair of antenna elements in an antenna array, especially, an M-MIMO antenna array, in a finite area becomes a challenging issue.

It is desirable to provide an apparatus and a method for reducing mutual couplings in an antenna array.

BRIEF SUMMARY

Generally, a device for reducing radio frequency (RF) and other electromagnetic radiation mutual coupling between antenna elements of an antenna array is disclosed. A pattern of flat, isolated metal patches is fixed in the near field above the antenna array, each patch directly above an antenna element or above and between multiple antenna elements. The patches are parallel to the ground plane of the antenna array. The patches can be made of metal or other electrically conductive material. For convenience here, the device is referred to as an array-antenna decoupling surface (ADS).

The patches generally have an even number of sides in which opposite sides are parallel to one another, such as rectangles, pluses, T's, and slightly curved versions thereof. They are placed to form segmented rectangles, pluses, frames, rings, and other geometric shapes. A square is a type of rectangle.

The patches are in a common plane, which can be easily formed on a low-dielectric constant substrate. They are in the near field of the antenna, their height above the array antenna's ground plane is preferably above 0.25 λc. They can be below 0.4 λc, where λc is the wavelength of the antenna's designed center frequency.

A size and shape of a patch is selected so as to minimize the mutual coupling scattering parameter ("s-parameter") between an underlying antenna element and its neighbor, or at least lower the s-parameter's magnitude and destructively interfere to some extent. A mutual coupling s-parameter between two elements are measured or simulated. An s-parameter between antenna elements 1 and 2 taken without the ADS is $S_{21}^{Array}$, and an s-parameter between the same elements with the ADS structure is $S_{21}^{ADS}$. A difference is defined as $S_{21}^{Refl} = S_{21}^{ADS} - S_{21}^{Array}$. The difference in magnitudes of $S_{21}^{Refl}$ and $S_{21}^{Array}$ can be minimized and/or the difference in opposite phases minimized.

To meet these objectives without causing substantial degradation of the antenna's performance, the patches should be less than 50% of a width of an underlying antenna element. Their longest dimension should be no greater than 0.3 of a shortest wavelength of the antenna's normal operating range.

Secondary patches can be interspersed within the pattern of (primary) patches. The secondary patches share the same restrictions on size as the primary patches. However, the secondary patches are for lessening mutual coupling s-parameters between an antenna element and a neighboring cross-polarized antenna element or farther away co-polarized neighbors.

Some aspects of the present disclosure include a near-field apparatus for reducing mutual couplings between antenna elements in an antenna array, the antenna array having a nominal operating range of frequencies and associated wavelengths. The apparatus includes a plurality of electrically conductive patches in a common plane configured to be supported above the antenna array, each electrically conductive patch being isolated from other patches, and a standoff structure configured to hold the common plane of electrically conductive patches parallel to and at a height from a ground plane of the antenna array. At least one electrically conductive patch of the plurality of electrically conductive patches is sized to diffract a portion of an electromagnetic wave from an underlying antenna element to a neighboring antenna element such that a mutual coupling s-parameter between the underlying antenna element and the neighboring antenna element, under a good matching condition, measured or simulated i) without the electrically conductive patches, $S_{21}^{Array}$, and ii) with the electrically conductive patches, $S_{21}^{ADS}$, with a difference defined as $S_{21}^{Refl} = S_{21}^{ADS} - S_{21}^{Array}$, meets the following criteria: $|S_{21}^{Refl}| = |S_{21}^{Array}| \pm 20\%$ of $|S_{21}^{Array}|$; and $\text{Phase}(S_{21}^{Refl}) = \text{Phase}(S_{21}^{Array}) + 180 \pm 30$ degrees. That is, the left hand side of each equation is within the range of the right hand side of the equation.

Each electrically conductive patch can have a width of less than 50% of an underlying antenna element and a longest dimension no greater than 0.3 of a shortest wavelength of the nominal operating range.

The height of the common plane of electrically conductive patches over the ground plane of the antenna array can be between 0.25 λc and 0.4 λc, wherein λc is an electromagnetic wavelength corresponding to a center frequency of the antenna array.

The height or a dimension of each electrically conductive patch can be selected to minimize a difference between $|S_{21}^{Refl}|$ and $|S_{21}^{Array}|$. Alternatively or in conjunction, the height or a dimension of each electrically conductive patch can be selected to minimize a difference between Phase $(S_{21}^{Refl})$ and Phase$(S_{21}^{Array})$+180 degrees.

The apparatus can further include a dielectric substrate upon which the plurality of electrically conductive patches are formed. The plurality of electrically conductive patches can include shapes having only right angles and an even number of parallel sides selected from the group consisting of a rectangle, a plus, a cross, a tee, an I, a #, an ell, a U, and a curved rectangle. A subset of the plurality of right-angled, electrically conductive patches can form a larger, symmetric shape selected from the group consisting of a segmented rectangle, a segmented plus, a segmented frame, and a segmented ring.

Each electrically conductive patch can be centered over an underlying antenna element or centered between two underlying antenna elements.

The apparatus can include the antenna array itself. The type of antenna array can include a linear air patch antenna array, a dual polarized linear dipole antenna array, a quadrifilar helix circularly polarized circular antenna array, or other type.

Referring to the plurality of electrically conductive patches as a "first" plurality of patches, the apparatus can further include a second plurality of electrically conductive patches in the common geometric plane, each of the second plurality of electrically conductive patches having an even number of sides, right angles at each edge, a width of less than 50% of an underlying antenna element, and a longest dimension no greater than 0.3 of a shortest wavelength of the nominal operating range. At least one electrically conductive patch of the second plurality of electrically conductive patches is sized to diffract a portion of an electromagnetic wave from an underlying antenna to a cross polarized neighboring antenna element.

The plurality of electrically conductive patches can form a periodic, non-periodic, symmetrical, or asymmetrical pattern.

Some aspects of the present disclosure include a method for reducing mutual couplings of antenna elements in an antenna array, the antenna array having a nominal operating range of frequencies and associated wavelengths. The method can include providing a plurality of electrically conductive patches in a common plane configured to be supported above the antenna array, each electrically conductive patch being isolated from other patches, supporting the common plane of electrically conductive patches parallel to and at a height above a ground plane of the antenna array, and diffracting, using the plurality of electrically conductive patches, a portion of an electromagnetic wave from an underlying antenna element to a neighboring antenna element such that a mutual coupling s-parameter between the underlying antenna element and the neighboring antenna element measured or simulated i) without the electrically conductive patches, $S_{21}^{Array}$, and ii) with the electrically conductive patches, $S_{21}^{ADS}$, with a difference defined as $S_{21}^{Refl}=S_{21}^{ADS}-S_{21}^{Array}$, meets the following criteria: $|S_{21}^{Refl}|=|S_{21}^{Array}|\pm20\%$ of $|S_{21}^{Array}|$; and Phase$(S_{21}^{Refl})=$ Phase$(S_{21}^{Array})$+180±30 degrees.

BRIEF DESCRIPTION OF DRAWINGS

FIG. 4 illustrates a top view of smaller square patches forming a larger segmented rectangle shape according to an embodiment of the present disclosure.

FIG. 5 illustrates a top view of a solid rectangle patch according to an embodiment of the present disclosure.

FIG. 6 illustrates a top view of a smaller plus-shaped patch and rectangular patches forming a larger segmented plus-shaped shape according to an embodiment of the present disclosure.

FIG. 7 illustrates a top view of L-shaped patches forming a larger segmented frame shape according to an embodiment of the present disclosure.

FIG. 8 illustrates a top view of a solid circle patch according to an embodiment of the present disclosure.

FIG. 9 illustrates a top view of curved rectangle patches forming a larger segmented ring shape according to an embodiment of the present disclosure.

FIG. 10 illustrates a top view of a plus-shaped patch, smaller square patches, and rectangular patches forming a larger segmented square shape according to an embodiment of the present disclosure.

FIG. 11 illustrates a top view of a smaller square patch and L-shaped patches forming a larger segmented square shape according to an embodiment of the present disclosure.

FIG. 16C is a close up top view of an antenna element of the antenna array of FIG. 16B.

FIG. 16D is a side view of the an antenna element of the antenna array of FIG. 16B.

DETAILED DESCRIPTION

Figure 1A:
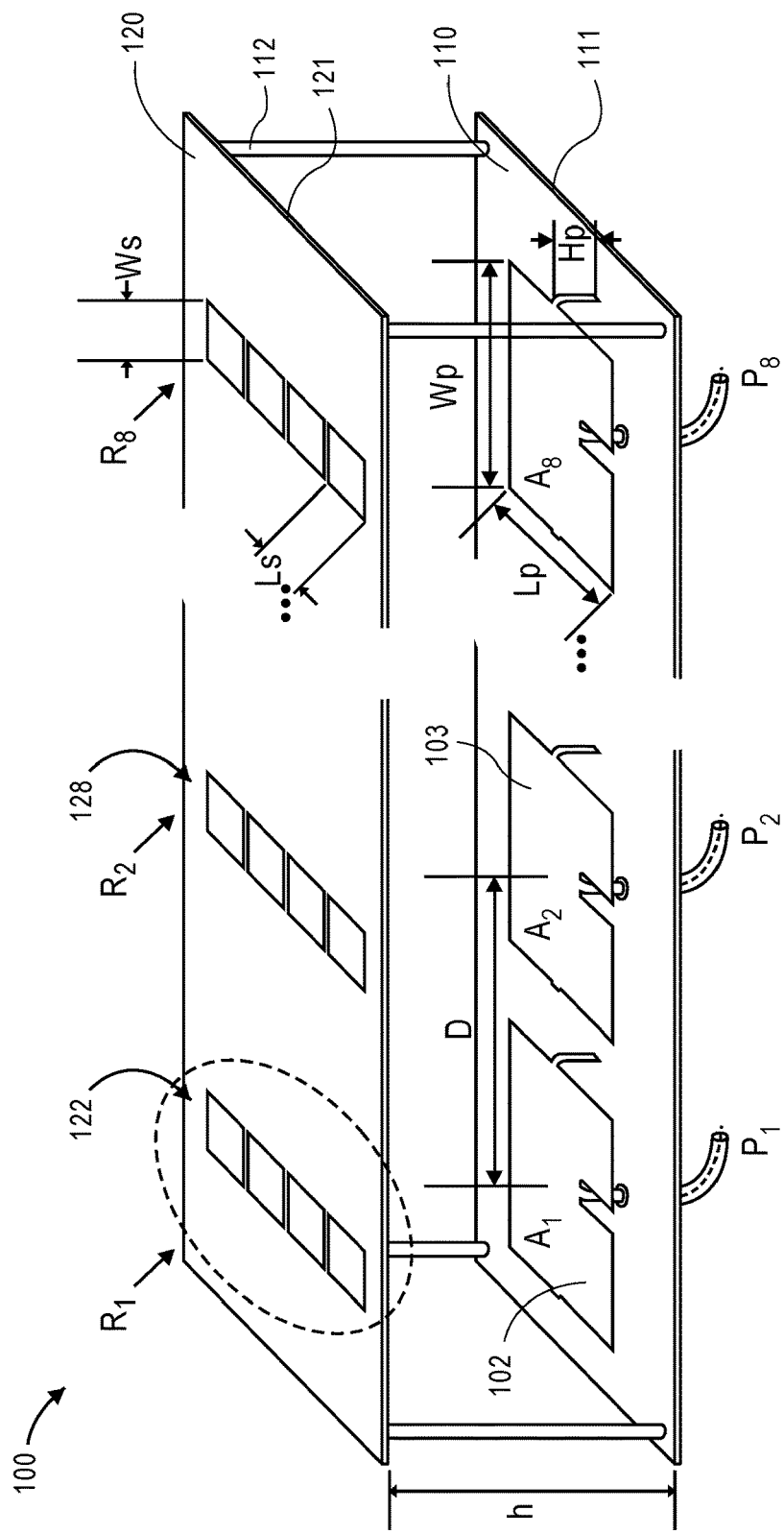
FIG. 1A is an isometric illustration of an array-antenna decoupling surface (ADS) over a linear air patch antenna array according to an embodiment of the present disclosure.

Hereinafter, the present application will be further explained in detail with reference to the accompanying drawings and embodiments. It should be understood that specific embodiments described herein intend to explain the relevant invention, rather than to limit the invention. In addition, it should be noted that only portions related to the present invention are shown in the accompanying drawings for the ease of description.

According to the present disclosure, an apparatus for reducing mutual couplings between antenna elements in an antenna array is provided, which is also referred to as array-antenna decoupling surface (ADS) hereinafter.

A pattern of flat conductive patches is placed in the reactive region of the near field (i.e., within a fractional wavelength) of an array antenna. The patches are parallel to the array antenna. Each patch is relatively small compared to the operating wavelengths They are less than 50% the width of an underlying antenna element and 0.3 of a shortest operating wavelength. They are set at a height above the ground plane of the antenna preferably above 0.25 λc, where λc is an electromagnetic wavelength corresponding to a center frequency of the antenna array. They can be below 0.4 λc in height in some configurations. The patches are sized to reduce or minimize mutual coupling s-parameters between underlying antenna elements without changing the original antenna characteristics significantly.

These patches are different from prior art patch structures for antennas. One reason for this is that these patches attack a different problem with antennas than recognized in the prior art or have different structure sizes and spacings because they do not invoke resonance for their operation.

In U.S. Pat. No. 6,061,027, issued 9 May 2000 to Legay et al., an antenna includes an exciter patch that receives an excitation signal and a plurality of secondary patches that radiate the waves received from the exciter patch. The structure includes a reflective surface, which could be the ground of the exciter patch, in the vicinity of the exciter patch and the secondary patches constitute semi-reflective surfaces. The combination is such that the waves radiated by the secondary patches are substantially in phase. The distance between the reflective surface and the secondary patches is substantially equal to half the wavelength to be transmitted. The structure maintains the purity of circular polarization over a wide angular sector.

However, the '027 patent does not concern array antennas with multiple radiating elements. Therefore, its secondary semi-reflective surfaces are not designed for reducing mutual couplings. For example in one embodiment the emitting patch is in (or near) a first plane constituting the reflective surface, or ground plane, and the secondary patches are at a distance equal to approximately half the wavelength to be transmitted. Under the above conditions, a wave emitted by the exciter patch towards a secondary patch travels a distance of one half wavelength. The corresponding beam is partly transmitted by the secondary patch, and therefore radiated outwards, and partly reflected. The reflected beam is directed towards the reflective surface from which it returns to the same secondary patch or to another secondary patch from which it is transmitted and thus radiated. The beam reflected at a secondary patch and which returns to another secondary patch therefore travels one wavelength. Accordingly, the two rays transmitted are in-phase. The in-phased rays provide sharper beam width so the directivity of the patch exciter is enhanced. Thus, the '027 patent's structure is for enhancing antenna directivity.

In U.S. Pat. No. 8,350,759, issued 8 Jan. 2013 to Ju et al., an antenna configuration is disclosed that has a metamaterial superstrate for improving gain and beamforming. The disclosure is directed to an antenna or an antenna array consisting of multiple antenna elements fed by one port through a feeding network rather than an array of antennas. The sizes of patches on the superstrate surface are comparable to a resonance condition in order to create sufficiently large reflection, and the spacing between the ground and superstrate surface is designed so that the resonator is in a resonance condition. Apparently, this is to cause multiple reflections between the ground and the superstrate surface in a resonance condition. Its main function is to enhance directivity of an antenna.

In U.S. Pat. No. 6,946,995, issued 20 Sep. 2005 to Choi et al., parasitic elements are stacked with radiating patches to form a microstrip antenna. This increases the antenna gain.

In U.S. Pat. No. 5,382,959, issued 17 Jan. 1995 to Pett et al., a subarray of parasitic patch elements is disposed on the top surface of a substrate layer above a driving patch antenna array. Each individual parasitic patch element is coupled to its corresponding driving patch antenna element through electromagnetic coupling, forming a broadband and high gain antenna element In U.S. Pat. No. 6,211,824, issued 3 Apr. 2001 to Holden et al., inhomogeneous dielectric layers of different dielectric constants is proposed for reducing surface wave effects so as to increase scan volume of the antenna. Stacked patch antennas are used by adding a second patch elements associated with each of the first patch radiator element for increasing frequency bandwidth of the patch antenna array.

In the '995, '959, and '824 patents, the spacing between the stacked patches and the radiating antenna is much less than 0.1 wavelength. Further, the electrical size of stacked patches is comparable to the radiating antenna in order to create another resonance mode.

In U.S. Pat. No. 8,633,866, issued 21 Jan. 2014 to Sarabandi et al., a thin frequency selective surface (FSS) is laid over the top of an antenna array. The layer performs the required frequency selective filtering. This single layer, instead of one filter per antenna element, can perform the filtering for a whole array of antenna elements.

In U.S. Pat. No. 8,681,064, issued 25 Mar. 2014 to Isom, another frequency selective surface (FSS) using a layer of lossy substrate is proposed. It is stacked against a radome and reduces coupling between antenna elements by absorbing laterally travelled waves at the price of attenuating useful signals, both transmitted and received.

In the '866 and '064 patents, the electrical size of the metal patches on the FSS is on the order of a half of the wavelength and thus designed to be in resonance condition at the working frequency of the antennas.

In E. Saenz, et al, "Coupling reduction between dipole antenna elements by using a planar meta-surface," IEEE Transactions on Antennas and Propagation, vol. 57, no. 2, pp. 383-394, February 2009, three grid layers sandwich an array antenna to reduce mutual couplings between elements of a linearly polarized dipole antenna array. The grid layers include metal strips that exhibit a magnetic resonant mode. Currents induced on individual paired metal strips cancel each other, allowing the incident wave to propagate through the grids. The surface must be placed very close to the antennas, and the size of the metal grid is comparable to the wavelength of the working frequency of the array antenna.

The references discussed above do not attack the problem of mutual coupling or use different structures in order to address it. The descriptions and figures herein will be used to describe the structure, equations, and theory of embodiments of the present invention.

Figure 1B:
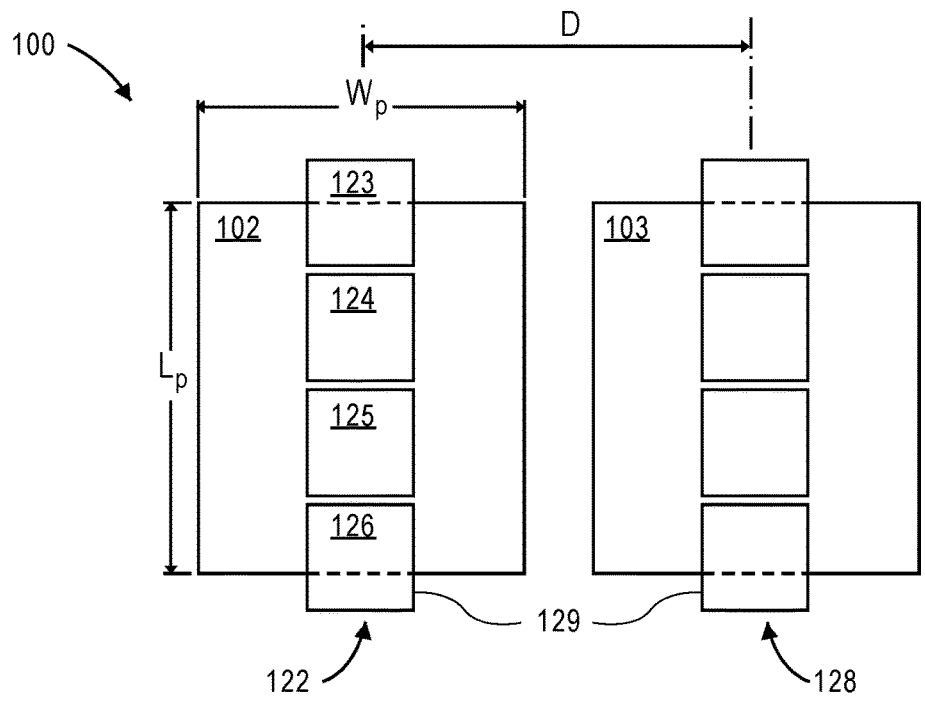
FIG. 1B is a top view of the ADS and antenna array of FIG. 1A.
Figure 1C:
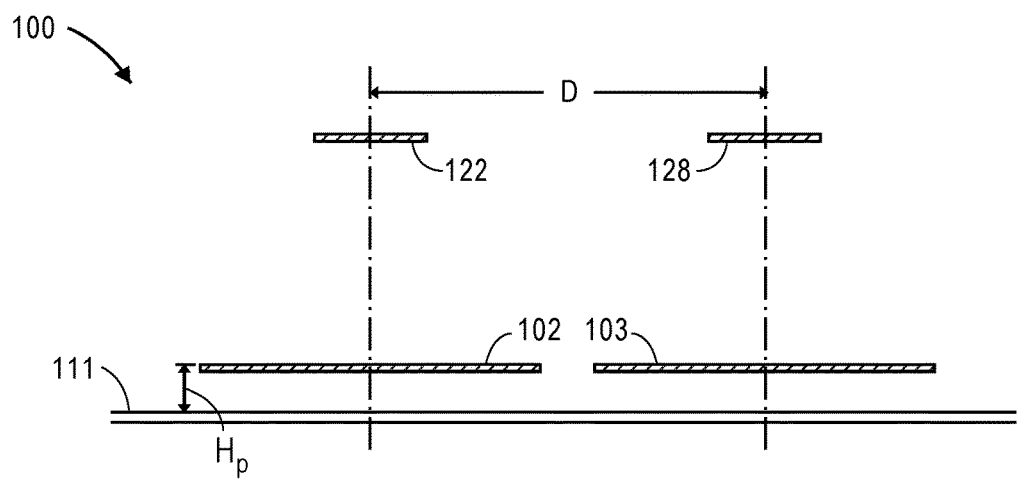
FIG. 1C is a side view of the ADS and antenna array of FIG. 1A.

FIGS. 1A-1C are isometric, top, and side views, respectively, of assembly 100 of array-antenna decoupling surface (ADS) 120 over an 8-element linear air patch antenna array 110. Linear air patch antenna array 110 includes eight antenna elements, A1, A2, . . . , A8, affixed to ground plane 111 and fed by ports P1, P2, . . . P8, respectively. Each antenna element is an air patch element with a height of Hp from the ground plane. Their lengths and widths are Lp and Wp, respectively. Each neighboring antenna element, such as antenna element 102 and antenna element 103, are centered distance D from each other.

ADS 120 includes eight sets of electrically conductive segmented patches 129, designated R1, R2, . . . , R8, printed on a dielectric substrate 121. The substrate can be a printed circuit board (PCB), plastic, or other suitable dielectric material. The electrically conductive and isolated patches can be formed by conventional PCB manufacturing means. Substrate 121, and thus the conductive patches, is held by standoff structure 112 parallel to and at a distance h from antenna array 110. This exemplary antenna array operates in the 2.45 GHz industrial, scientific, and medical radio (ISM) band.

A "standoff structure" can include any supporting arrangement that can rigidly hold an ADS in a fixed position over an antenna array. The standoff structure can include simple metal standoffs, dielectric spacers, a cage, truss, cantilever, shell, housing, radome, or any other structure, fixed or reconfigurable, deemed suitable by one of ordinary skill in the art.

In this embodiment, only a set of primary conductive patches are provided. Each of the segmented patches R1, R2, . . . , R8 is broken into four pieces of smaller electrically conductive patches. The segmentation avoids a resonance effect. Using broken metal rectangular reflectors instead of a long strip avoids creating resonance near the working frequency by the ADS while still introducing sufficient amount of diffraction. Each rectangular reflector strip may also be broken into other number of pieces as long as resonant frequency of the reflector strip is not close to the working frequency of the antenna array.

FIG. 1B depicts details of a segmented reflector. Reflector 122 is segmented into four patches 123, 124, 125, and 126. The dimensions of the antenna elements and the ADS patches are given in Table I. Because the gap $D_s$ is not very sensitive to the decoupling performance, it is set to 1.0 mm.

TABLE I

DIMENSIONS OF THE 8-ELEMENT AIR PATCH ARRAY IN MM

| Wp | Lp | Ls | Ws | Hp | Ds | h | D |
|----|----|----|----|----|----|----|----|
| 45 | 52.5 | 15 | 15 | 7 | 1 | 38 | 55 |

In this embodiment, each segmented rectangular reflector strip is placed directly above its corresponding antenna element and is in-line with the polarization direction. Therefore, like the antenna elements, the distance between centers of neighboring segmented reflector strips, such as conductive patches 122 and 128, is D.

Figure 2A:
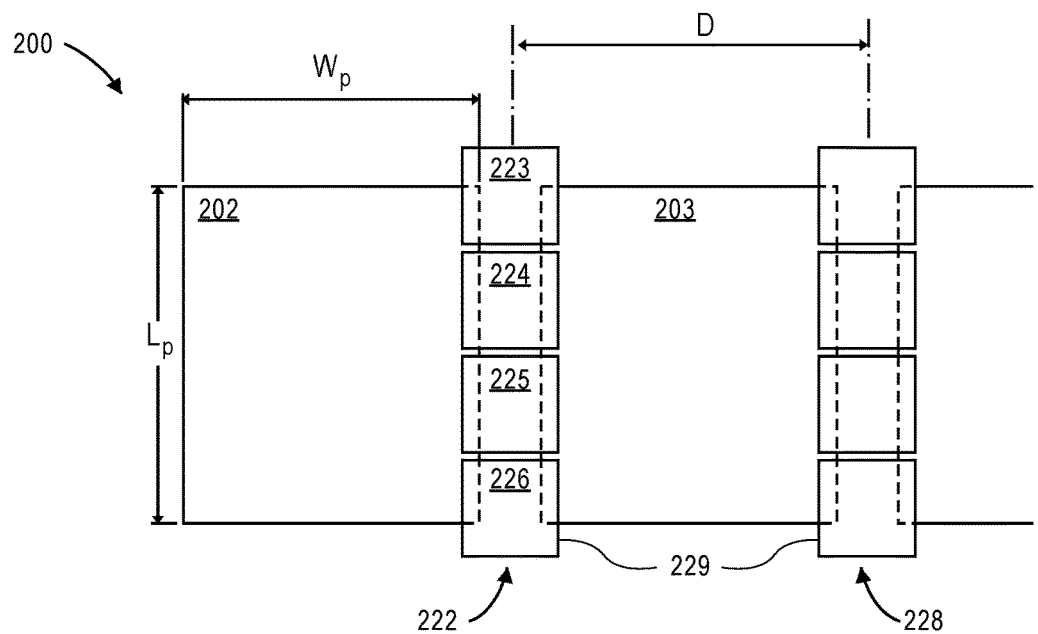
FIG. 2A is a top view of an alternately spaced ADS and antenna array according to an embodiment of the present disclosure.
Figure 2B:
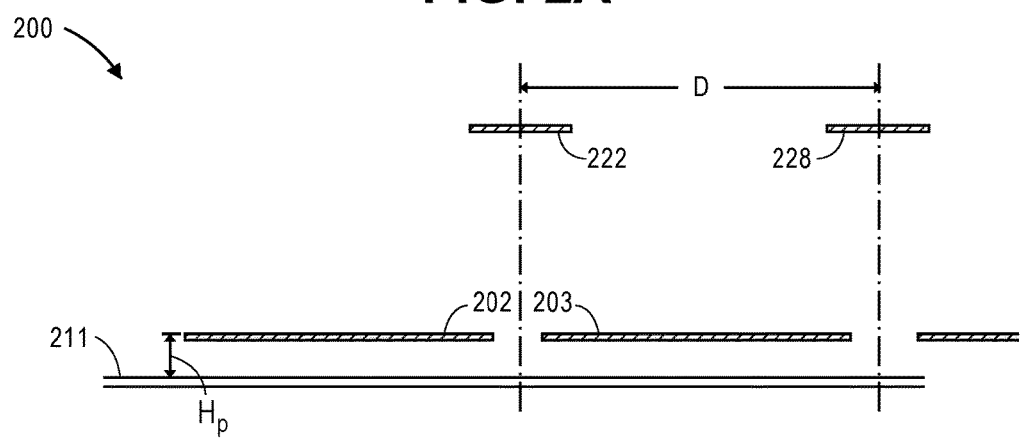
FIG. 2B is a side view of the ADS and antenna array of FIG. 2A.

FIGS. 2A-2B are top and side views of an alternately spaced ADS over a linear air patch array according to an embodiment of the present disclosure. Instead of being directly over the center of each antenna element as in FIG. 1, segmented patch 222 is placed between antenna elements 202 and 203. Segmented patch 228 is between antenna element 203 and the next antenna element, and so on, such that segmented patches 229 are centered between antenna elements. Segmented patch 222 is divided into electrically isolated electrically conductive patches 223, 224, 225, and 226, which generally will not have the same dimension as those in Table I.

Figure 3:
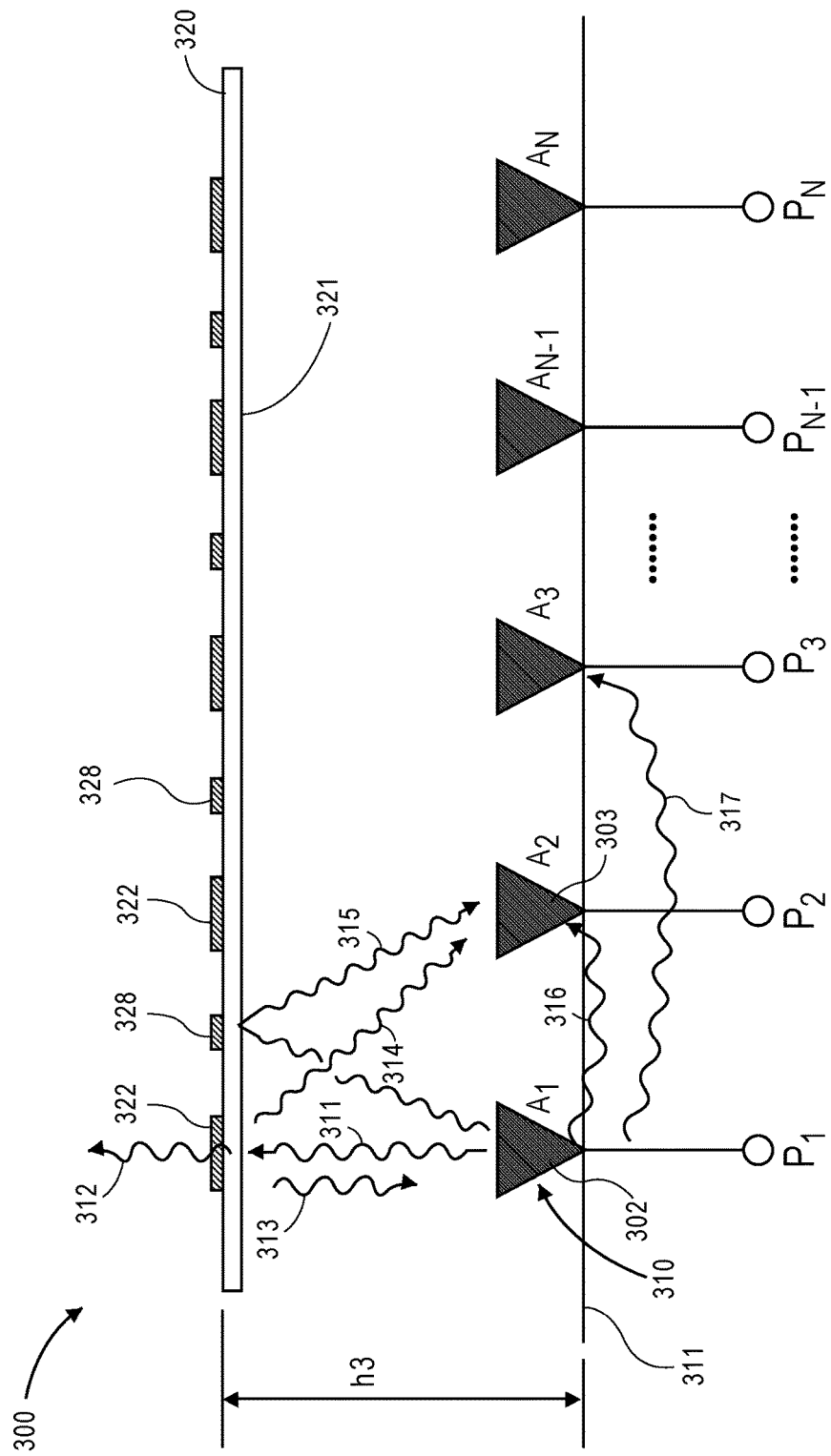
FIG. 3 is a side schematic view of an antenna array with an array-antenna decoupling surface according to an embodiment of the present disclosure.

FIG. 3 is a side schematic view of system 300 with antenna array 310 with ADS 320 according to an embodiment of the present disclosure. Antenna array 310 includes N antenna elements designated $A_1, A_2, A_3 \ldots A_{N-1}$, and $A_N$, such as neighboring antennas 302 and 303. ADS 320 is parallel to and at a distance h3 from the ground plane of antenna array 310. Each of the antenna elements $A_1, A_2, A_3 \ldots A_{N-1}$, and $A_N$ is connected to a corresponding port designated $P_1, P_2, P_3 \ldots P_{N-1}$, and $P_N$. Electromagnetic waves transmitted from a port are propagated via the antenna element connected thereto.

Distance h3 between ADS 320 and antenna array 310 is determined to ensure that the partial reflected wave is mostly out of phase of the coupled waves at the port of the coupled antenna element. ADS 320 is located in the near-field, reactive region of the antenna array 310. Because the phases of the reflected electromagnetic waves depend on height h3, according to one embodiment, height h3 is usually less than half of the wavelength of the electromagnetic wave transmitted from the antenna. It is noted that height h3 is sensitive to the decoupling performance. Height h3 may be in a range from 0.25 to 0.4 wavelength of the electromagnetic wave transmitted from the antenna array 310. Optionally, height h3 may be larger than 0.25 wavelength of the electromagnetic wave transmitted from the antenna array 310. Optionally, height h3 may be less than 0.4 wavelength of the electromagnetic wave transmitted from the antenna array 310.

ADS 320 is a substrate 321 printed with a plurality of primary conductive patches 322 and secondary conductive patches 328. Substrate 321 is a thin layer of low loss, low dielectric-constant substrate. The plurality of segmented, conductive patches 322, 328 are metal reflection patches for reflecting a portion of the electromagnetic waves transmitted from the antenna elements. The geometries and the dimensions of the patches are chosen, based on mutual coupling s-parameters, to create a proper amount of reflected waves at the port of the coupled antenna element to reduce or cancel the coupled waves while minimizing the perturbation to the original antenna array.

The plurality of conductive patches 322, 328 include a first set of patches 322 functioning as primary reflectors and a second set of patches 328 functioning as secondary reflectors. Primary reflectors 322 are for providing major reflected waves, usually in the same polarization as that of the coupled waves. Secondary reflectors 328 are for creating minor reflected waves to mitigate weaker mutual couplings, such as the mutual coupling in cross polarization, or for fine tuning of the major reflected waves.

With the ADS provided, the energy radiated from antenna element 302, i.e., the electromagnetic (EM) wave being radiate forward 311, consists of four portions: the electromagnetic (EM) wave being radiated outward into far space 312; the reflected wave received by the transmitting antenna 313; the reflected waves from the primary reflector patches 314; and the reflected waves from the secondary reflector patches 315. The primary objective of providing the ADS according to the present application is to reduce or cancel the mutual couplings between two adjacent antenna elements 316, while not deteriorating the mutual couplings among non-adjacent antenna elements 317, which are assumed to be weak enough to worry about. As the ADS is located in the reactive region of the antenna array, use of the word "reflected waves" is not technically accurate. Herein, it is used only to mean the diffracted waves of the ADS that are received by the antenna elements.

For a given antenna array, the mutual couplings, i.e., unwanted electromagnetic waves, between the adjacent antenna elements are typically measured or simulated. In theory according to an embodiment of the present disclosure, the geometries and/or the sizes of the electrically conductive patches and the height between the ADS and the antenna array are chosen so that the reflected electromagnetic waves cancel the unwanted electromagnetic waves, i.e., mutual couplings, between the adjacent antenna elements. In particular, the geometries and/or the sizes of the conductive patches and the distance between the ADS and the antenna array are designed so that the reflected electromagnetic waves have the same amplitude as the unwanted electromagnetic waves but are out of phase of the unwanted electromagnetic waves. Thus, the reflected electromagnetic waves would significantly reduce or cancel the unwanted electromagnetic waves between the adjacent antenna elements.

Naturally, the designs of the geometries and/or the sizes of the conductive patches and the distance between the ADS and the antenna array depend on the structure of the antenna array. Certain geometries of segmented patches and their constituent electrically conductive patches have been found to be particularly effective.

FIGS. 4-11 illustrate some geometries of effective electrically conductive solid patches and segmented reflection patches and their subcomponent patches.

FIGS. 4-5 illustrate effective geometries of metal reflection patches for linearly polarized antenna elements.

In FIG. 4, segmented patch 400 includes rectangular patches and gaps with dimensions 401, 402, and 403 as shown.

In FIG. 5, solid patch 500 includes a rectangular patch with dimensions 501 and 502.

FIGS. 6-7 illustrate effective geometries of metal reflection patches for dual polarized antennas elements.

In FIG. 6, segmented cross patch 600 includes rectangular patches and gaps with a single cross patch with dimensions 601, 602, 603, 604, and 605 as shown.

In FIG. 7, segmented frame patch 700 includes ell ("L") patches and gaps with dimensions 701, 702, 703, 704, and 705 as shown.

FIGS. 8-9 illustrate effective geometries of metal reflection patches for circularly polarized antennas.

In FIG. 8, solid circular patch 800 has diameter 801 as shown.

In FIG. 9, segmented circle patch 900 includes eight curved rectangular patches and gaps with dimensions 901, 902, and 903 as shown.

FIGS. 10-11 illustrate effective geometries of metal reflection patches for some composite configurations that may provide more design flexibilities in both magnitude and phase controls.

In FIG. 10, segmented rectangle patch 1000 includes rectangular patches and a single cross patch with dimensions 1001, 1002, 1003, 1004, 1005, 1006, 1007, 1008, 1009, 1010, 1011, 1012, 1013, and 1014 as shown.

In FIG. 11, segmented rectangle patch 1100 includes four L patches and gaps and a single rectangular patch with dimensions 1101, 1102, 1103, 1104, 1105, 1106, 1107, 1108, 1109, 1110, 1111, and 1112 as shown.

All of the shapes shown have right angles and an even number of parallel sides, such as the rectangles, pluses, crosses, tees ("T"), and ells ("L"). Suitable shapes not shown include an I, a hash mark ("#"), and a U shape. The slightly curved rectangles have what are considered right angles.

Different patch geometries may be used to accommodate different antenna arrangements. Among all the possible geometries, the rectangular and the cross-shaped patches are simplest and most effective for both the single and dual linearly polarized antenna elements. In order to minimize the perturbation to the original antenna array, a broken patch consisting of a number of small metal patches instead of a large patch may be preferred to avoid any resonance effect. Multiple primary reflector patches create main reflected waves and a few groups of secondary reflector patches to compensate the missing components of the main reflected waves.

According to the present disclosure, the conductive patches are not designed to be in a resonance condition and are not necessarily a periodic structure either. The conductive patches may be either periodic or non-periodic depending on the arrangement of the antenna elements in the antenna array.

As mentioned above, a portion of electromagnetic waves transmitted by different antenna elements other than the main outgoing portion towards space, may interfere with each other. In particular, the electromagnetic waves transmitted by adjacent antenna elements interfere with each other in an undesired way, resulting in unwanted electromagnetic waves which cause mutual couplings between the adjacent antenna elements in the antenna array. Because the mutual couplings among non-adjacent elements is not significant, for most of practical antenna arrays, only the mutual coupling between two adjacent antenna elements is concerned.

The decoupling conditions of an ADS can be explained using S-parameters of two coupled antennas with and without applying the ADS. Taking the mutual coupling between elements 1 and 2 as an example and assuming that the matching conditions of the two elements with and without the ADS are sufficiently good, the difference of the wave transmitted from element 1 and received by element 2 with and without the ADS can be expressed by $$S_{21}^{Refl} = S_{21}^{ADS} - S_{21}^{Array} \quad \text{(Eqn. 1)}$$

where $S_{21}^{ADS}$ is the $S_{21}$ parameter when the ADS is applied, and $S_{21}^{Array}$ is the $S_{21}$ parameter of the original array antenna without adding the ADS. Therefore, the decoupling condition between the two antenna ports or the condition for $S_{21}^{ADS}=0$ is $$|S_{21}^{Refl}| = |S_{21}^{Array}| \quad \text{(Eqn. 2a)}$$

$$\text{Phase of } (S_{21}^{Refl}) = \text{Phase of } (S_{21}^{Array}) + \pi \quad \text{(Eqn. 2b)}$$

These equations may not be able to be solved exactly for a particular antenna array. However, they can be approached. For example, the height, longest dimension, or other dimension of each electrically conductive patch can be selected to minimize a difference between $|S_{21}^{Refl}|$ and $|S_{21}^{Array}|$. Or, they can be selected to minimize a difference between Phase($S_{21}^{Refl}$) and Phase($S_{21}^{Array}$)+180 degrees.

Unless otherwise specified, the use of the digits '1' and '2' in the subscripts of the S-parameter is merely for convenience and to show that two neighboring antenna elements are implied—rather than limit to elements designated '1' and '2' on any particular antenna.

For a given antenna array, the mutual couplings (i.e., unwanted electromagnetic waves) between the adjacent antenna elements are known. That is, the parameter $S_{21}^{Array}$ is known. Intuitively, the height of the ADS above the antennas determines the phase of the partial reflected wave and the size of the reflection metal reflector on the ADS controls the intensity of the reflected wave. This intuition can be well justified by a parametric study.

Figure 12A:
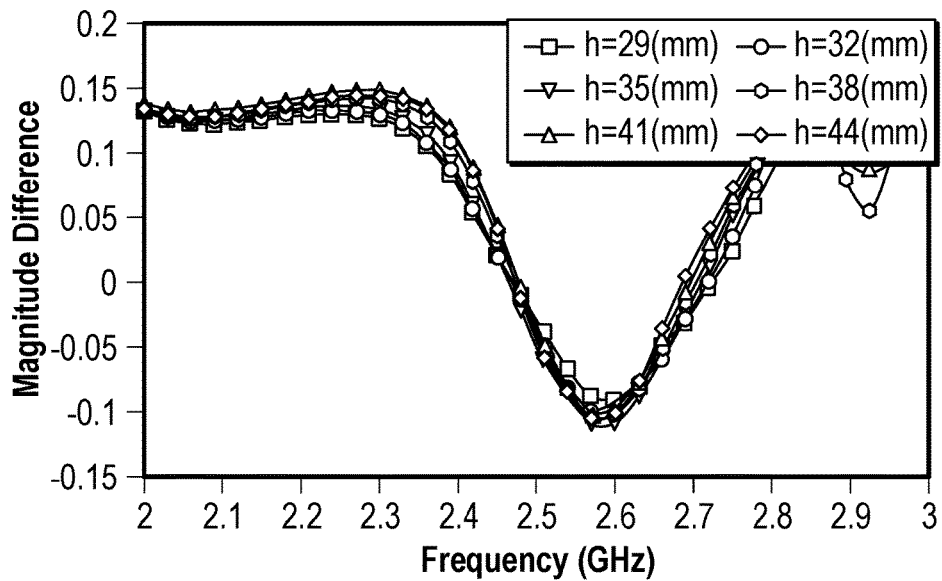
FIG. 12A charts simulated magnitude differences obtained according to the antenna assembly of FIG. 1A with different heights.

FIG. 12A shows the magnitude difference of $|S_{21}^{Refl}| - |S_{21}^{Array}|$ verses frequency for different heights h, from 29 to 44 mm (millimeters). It is seen that the decoupling condition for magnitude at the center frequency 2.45 GHz does not change very much.

Figure 12B:
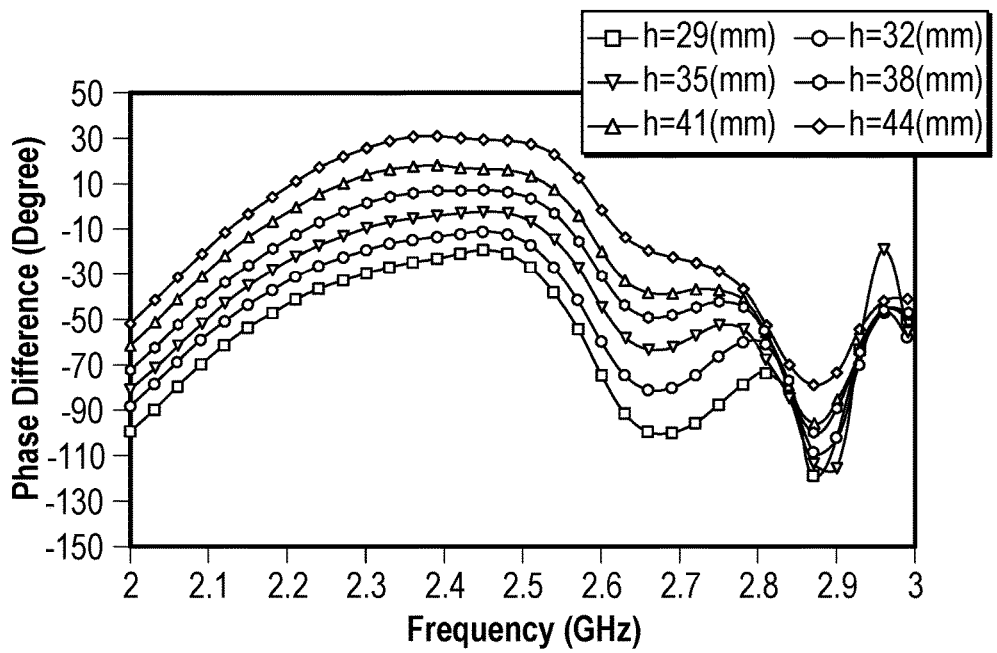
FIG. 12B charts simulated phase differences obtained according to the antenna assembly of FIG. 1A with different heights.

FIG. 12B, however, shows decoupling condition for the phase difference, which is calculated by the difference of the left hand side (LHS) and the right hand side (RHS) of Equation 2(b), varies in a range of 60 degrees.

Figure 12C:
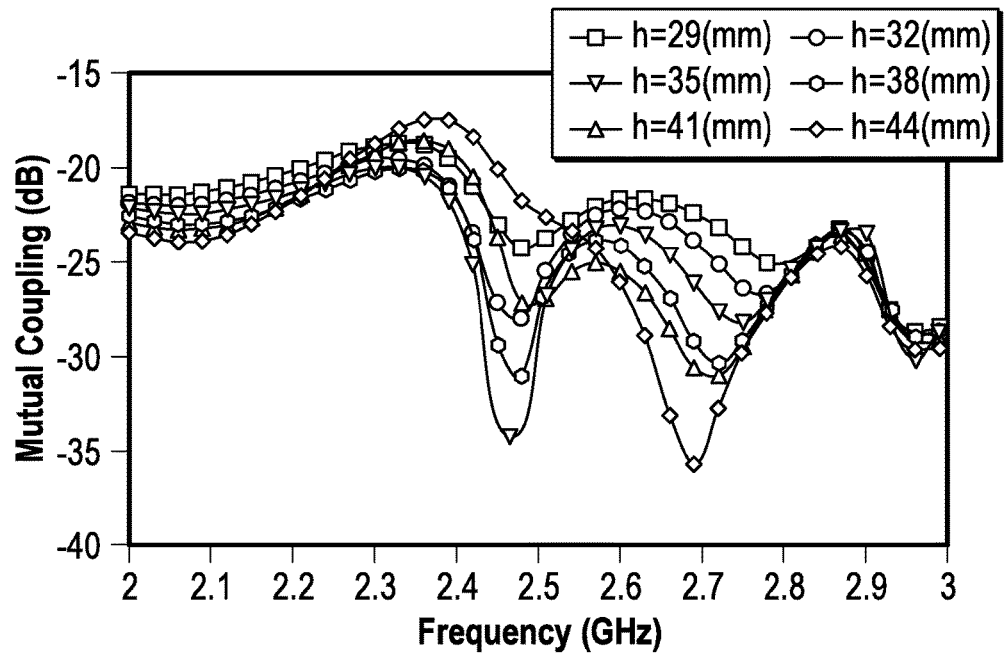
FIG. 12C charts simulated mutual couplings obtained according to the antenna assembly of FIG. 1A with different heights.

FIG. 12C shows, with an appropriate set of dimensions of the ADS, that a wide range of heights can achieve a reasonable good decoupling level. The deepest decoupling level of the ADS can be achieved when the decoupling conditions for both the magnitude and the phase difference are satisfied at the center frequency 2.45 GHz.

Figure 13A:
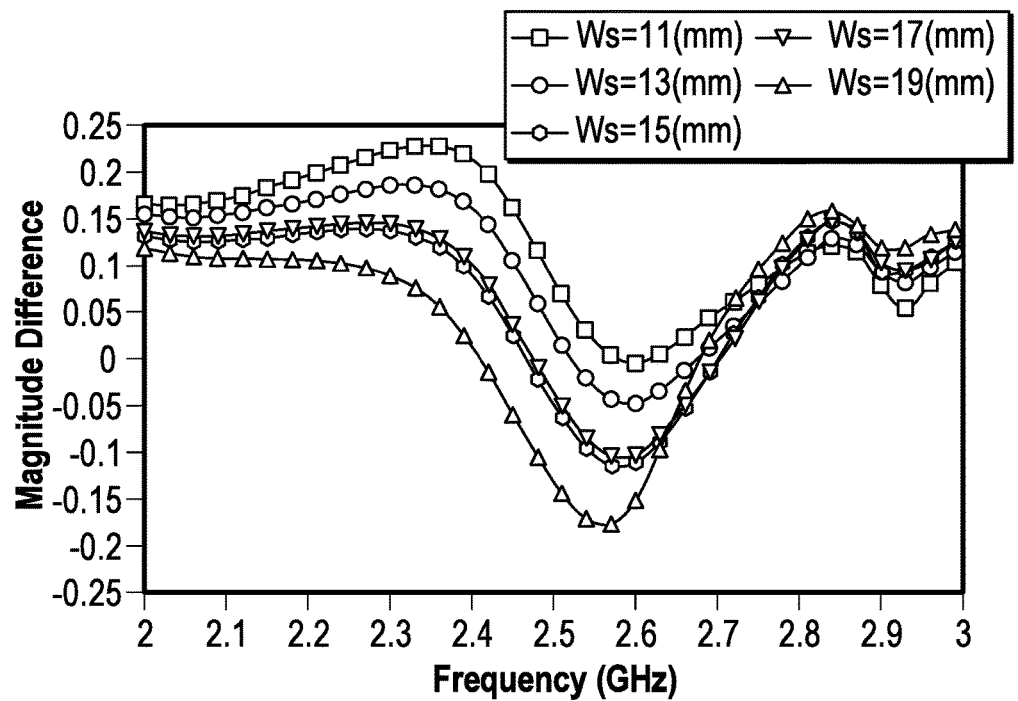
FIG. 13A charts simulated magnitude differences obtained according to the antenna assembly of FIG. 1A with different sizes of metal strips.
Figure 13B:
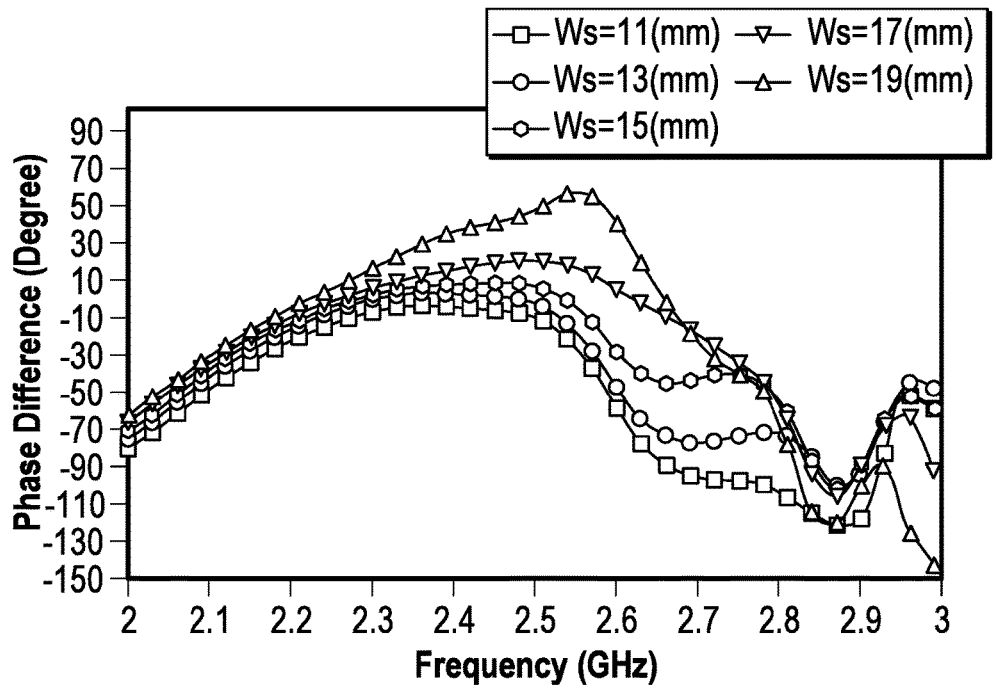
FIG. 13B charts simulated phase differences obtained according to the antenna assembly of FIG. 1A with different sizes of metal strips.
Figure 13C:
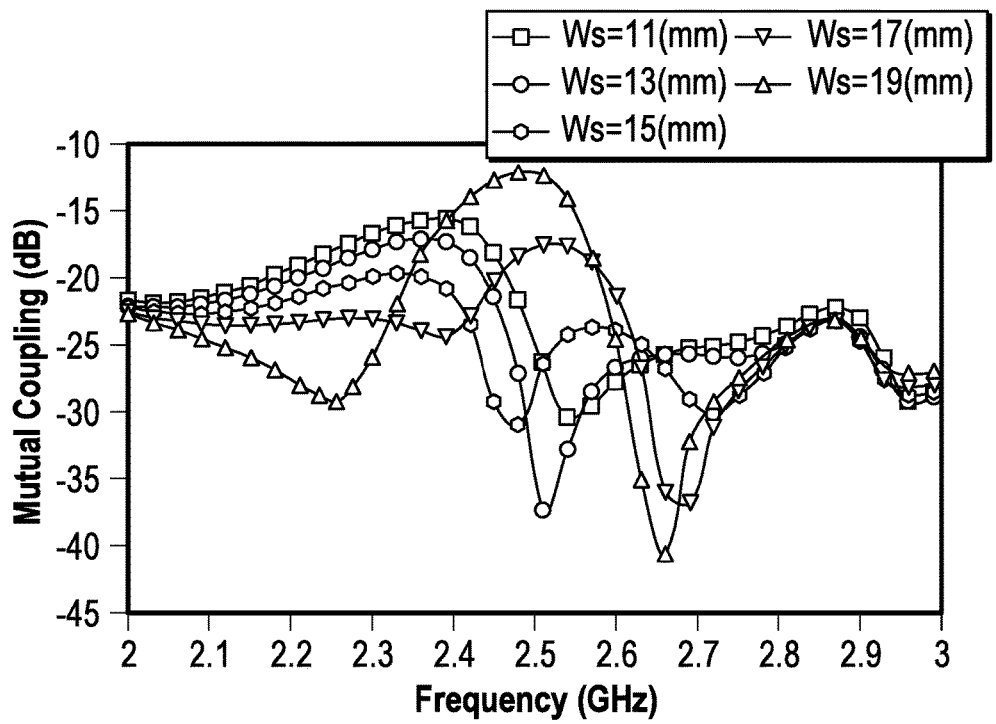
FIG. 13C charts simulated mutual couplings obtained according to the antenna assembly of FIG. 1A with different sizes of metal strips.
Figure 14A:
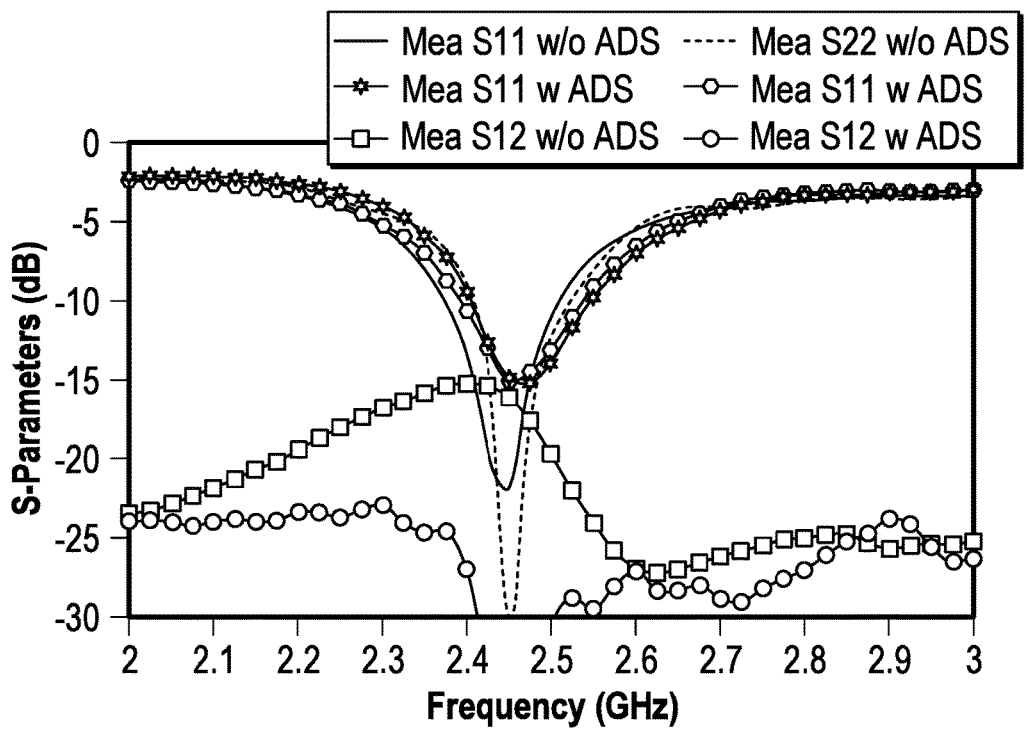
FIG. 14A charts S-parameters of the antenna array of FIG. 1A with and without the ADS between antenna elements.
Figure 14B:
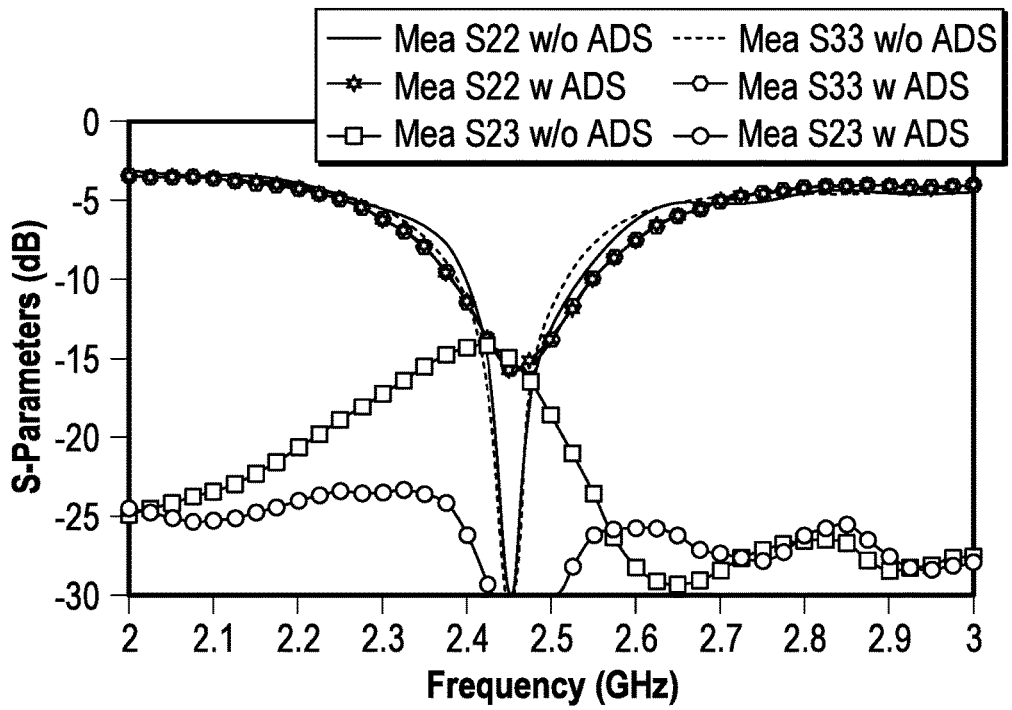
FIG. 14B charts S-parameters of the antenna array of FIG. 1A with and without the ADS between antenna elements.
Figure 14C:
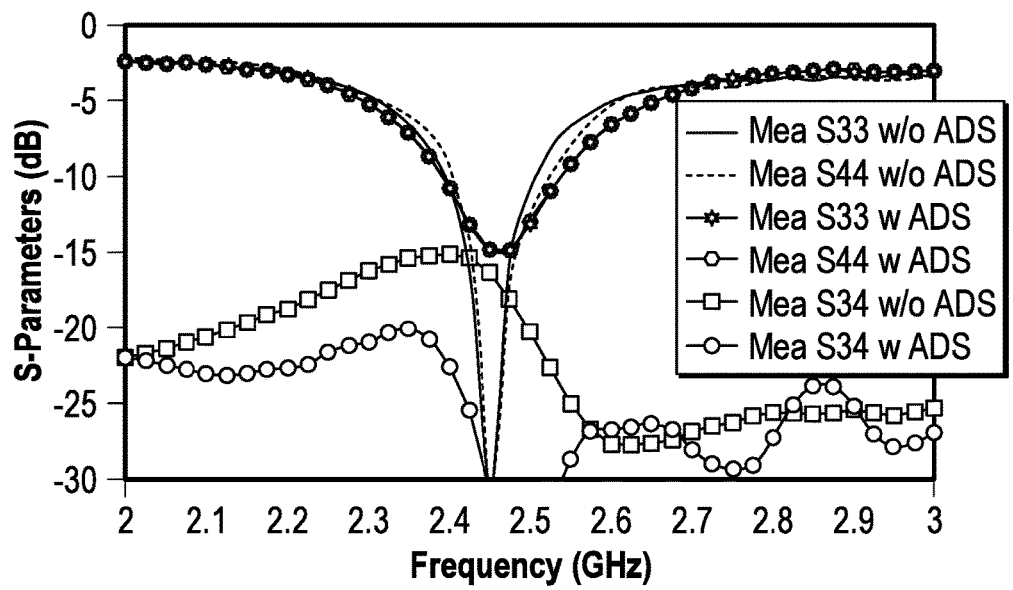
FIG. 14C charts S-parameters of the antenna array of FIG. 1A with and without the ADS between antenna elements.
Figure 14D:
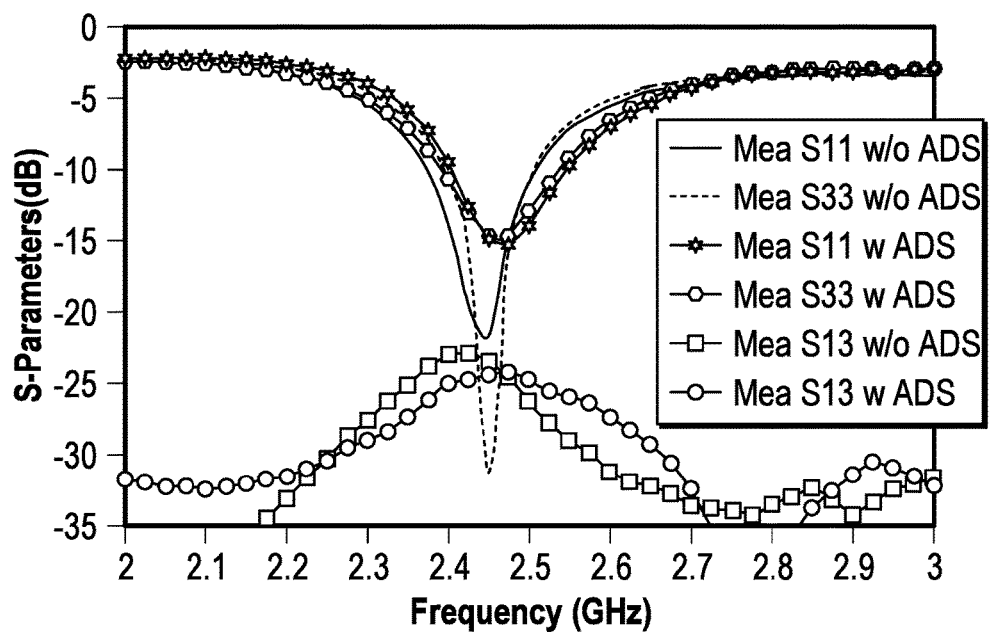
FIG. 14D charts S-parameters of the antenna array of FIG. 1A with and without the ADS between antenna elements.

FIGS. 13A-C chart how the sizes of the reflection patches affect the decoupling conditions and consequently the decoupling performance.

FIG. 13A demonstrates that as the size Ws of the reflection patches varies from 11 to 19 mm, the magnitude difference of $|S_{21}^{Refl}| - |S_{21}^{Array}|$ varies significantly. When the size varies between 15 and 17 mm, the decoupling condition for magnitude can be well satisfied at the center frequency. However, when the size becomes larger, the reflected wave tends to be stronger and the decoupling condition moves towards a lower frequency or conversely when the size is smaller.

FIG. 13B shows the phase difference of the LHS and the RHS of Equation 2b for different sizes of Ws. When the size varies between 13 and 15 mm, the phase difference is close to 0 in a wide frequency range. Two attractive properties of the ADS in satisfying the phase condition can be observed in the figure: 1) the phase difference is insensitive to the variation of the size of the reflector; and 2) the ripple of the phase difference is very small over a wide frequency range.

FIG. 13C shows the overall decoupling level for different sizes of Ws when the height h is set to 38 mm. A deep notch at the center frequency of 2.45 GHz is seen when the size Ws is close to 15 mm, indicating that the reflected waves almost completely interfere the unwanted mutual coupling.

The size of the reflection patches on the ADS decides the magnitude condition and the height of the ADS determines the phase condition. When the two conditions are well satisfied simultaneously, the deepest decoupling level can be achieved. Furthermore, when the two decoupling conditions are approximately satisfied, there is still a satisfactory decoupling improvement obtained in a wide frequency range.

Testing results for the 8-element linear air patch antenna array of FIGS. 1A-1C, the ADS of which has a substrate with dielectric constant of 2.6, loss tangent of 0.001, and thickness of 1.0 mm, are indicative of advantages FIGS. 14A-14D and FIGS. 15A-15D chart the measured s-parameters and active radiation characteristics measured using a Satimo Industries SG128 spherical near-field scanner in an ISO17025 accredited laboratory. In measuring the concerned S-parameters and radiation patterns of an antenna element, other unmeasured antenna ports are terminated by the 50Ω loads.

FIGS. 14A-14D show the measured S-parameters between some of the interested antenna ports. Due to the symmetry of the array, only the S-parameters of port $P_1$ through port P$_4$ are presented. It is clearly seen that the mutual coupling between any two adjacent elements, for example S$_{12}$, S$_{23}$, or S$_{34}$, is significantly reduced from about −15 dB to below −30 dB. Meanwhile, the mutual coupling between non-adjacent elements, for example S$_{13}$, maintains at the same level or is improved a little. For these measurements, all of the antenna ports were not re-matched after applying the ADS, demonstrating that introducing the ADS does not affect the matching condition of the original array antenna significantly. Also, the decoupling bandwidth for mutual coupling being reduced from −15 dB to better than −24 dB is much wider than that of 10 dB return loss (RL), demonstrating the potential for a wide band decoupling. It is also shown that antenna matching condition (S-parameters |S$_{11}$|, |S$_{22}$|, |S$_{33}$| and |S$_{44}$|) can be tuned to the same level as those of original antenna elements.

Figure 15A:
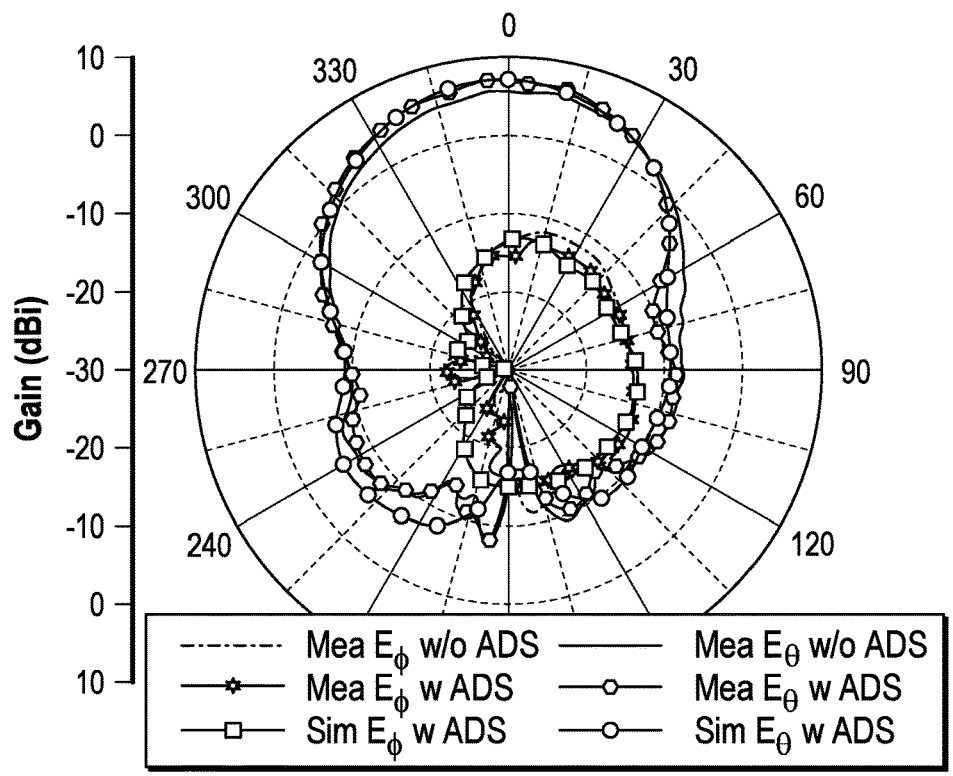
FIG. 15A charts E-plane active radiation patterns of element 1 of the antenna array of FIG. 1A with and without ADS.
Figure 15B:
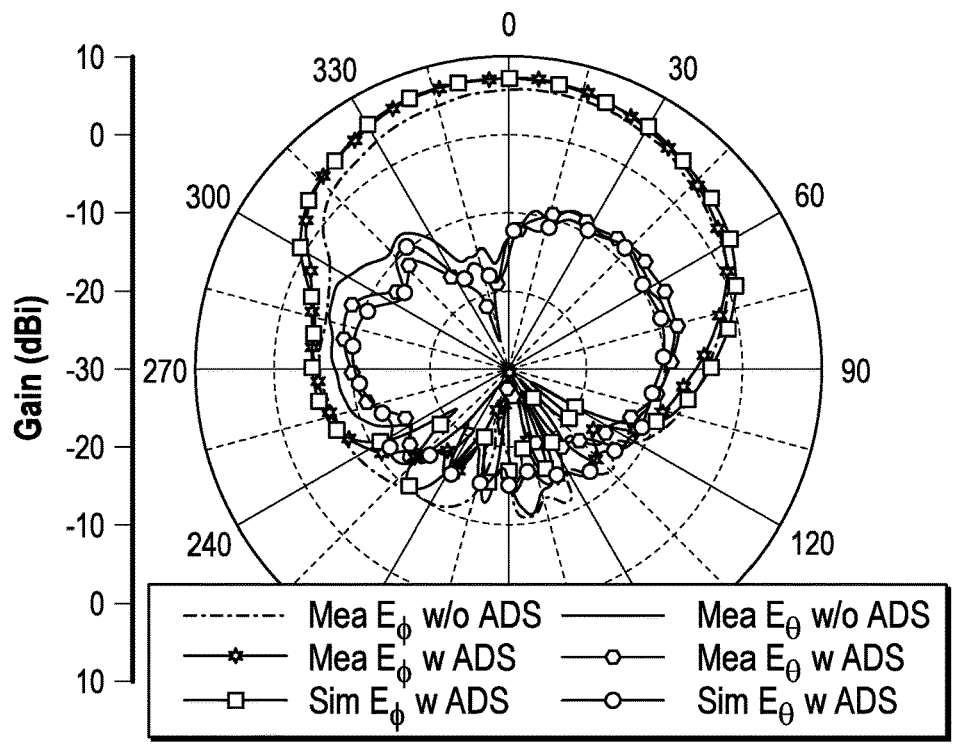
FIG. 15B charts H-plane active radiation patterns of element 1 of the antenna array of FIG. 1A with and without ADS.
Figure 15C:
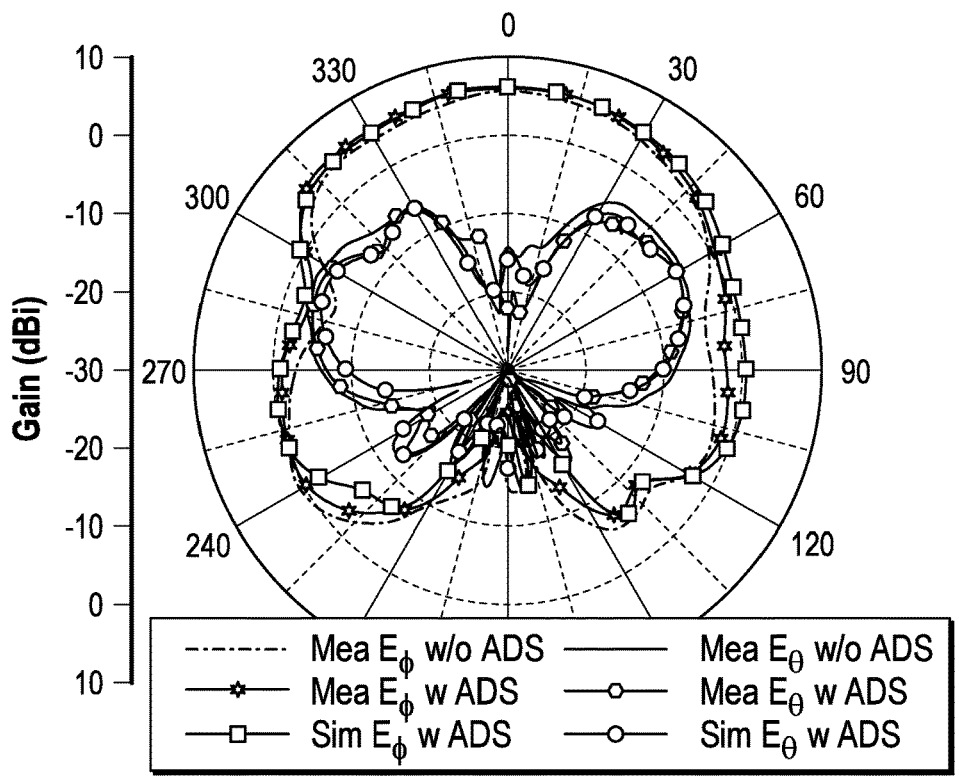
FIG. 15C charts H-plane active radiation patterns of element 3 of the antenna array of FIG. 1A with and without ADS.
Figure 15D:
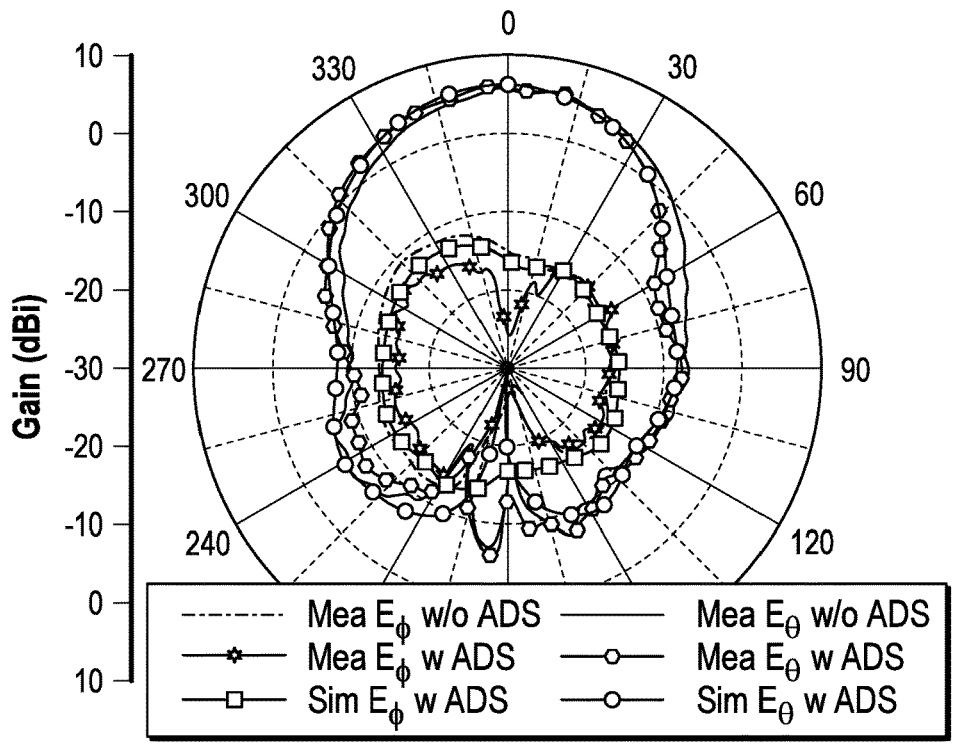
FIG. 15D charts E-plane active radiation patterns of element 3 of the antenna array of FIG. 1A with and without ADS.

FIGS. 15A-15D present the radiation patterns of antenna elements A$_1$ and A$_3$ with and without the ADS. FIG. 15A charts E-plane patterns of element 1. FIG. 15B charts H-plane patterns of element 1. FIG. 15C charts E-plane patterns of element 3. FIG. 15D charts H-plane patterns of element 3. It is shown that for an edge antenna element, i.e. element A$_1$, the antenna gain is apparently enhanced after applying the ADS. However, for an internal element, e.g. element A$_3$, the gain improvement is not obvious. Nevertheless, the beam widths, both in the E- and H-planes, of the array elements with and without the ADS appear to be about the same. The measured patterns for the array elements with the ADS are verified by Ansys HFSS (high frequency structure simulator) EM simulation. The correlation between the measured and the simulated is very good.

Figure 16B:
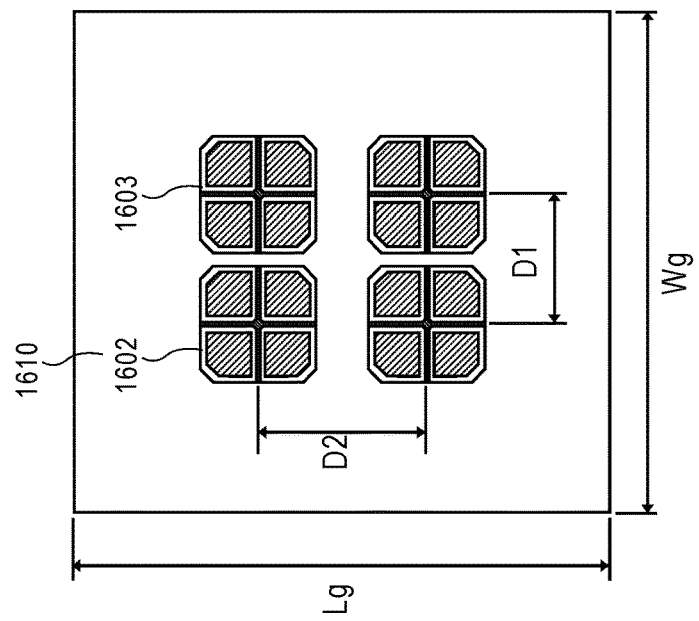
FIG. 16B is a top view of the antenna array, without the ADS, of FIG. 16A.
Figure 16A:
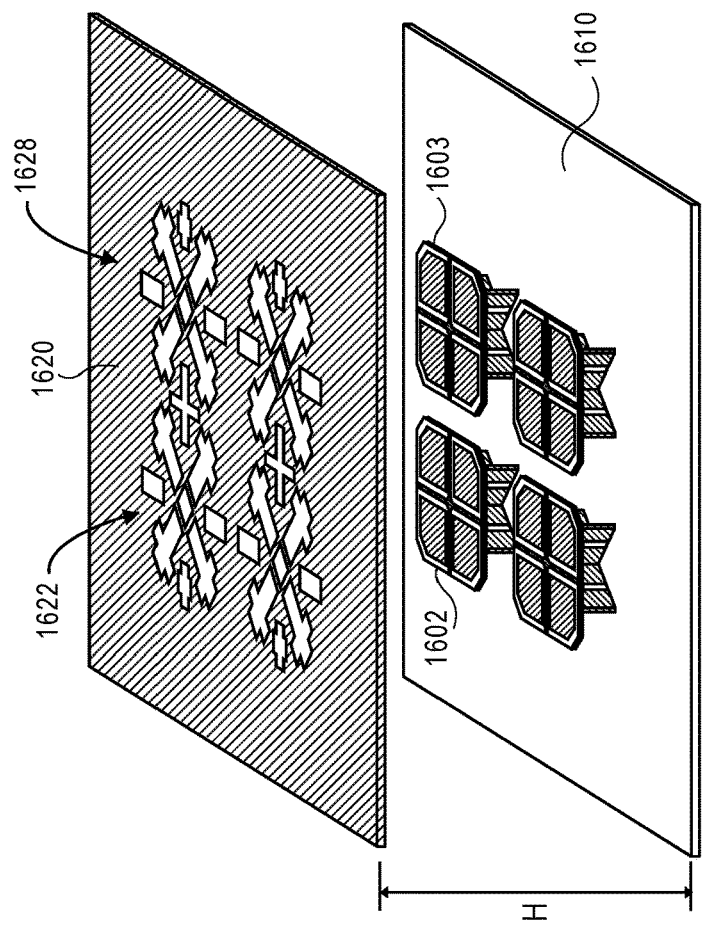
FIG. 16A is an isometric illustration of an array-antenna decoupling surface (ADS) over a 2 by 2 dual polarized 8-element linear dipole antenna array according to an embodiment of the present disclosure.
Figure 16E:
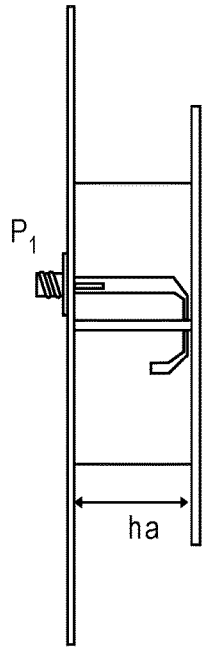
FIG. 16E is an adjacent side view of the antenna element of the antenna array of FIG. 16B.
Figure 16E:
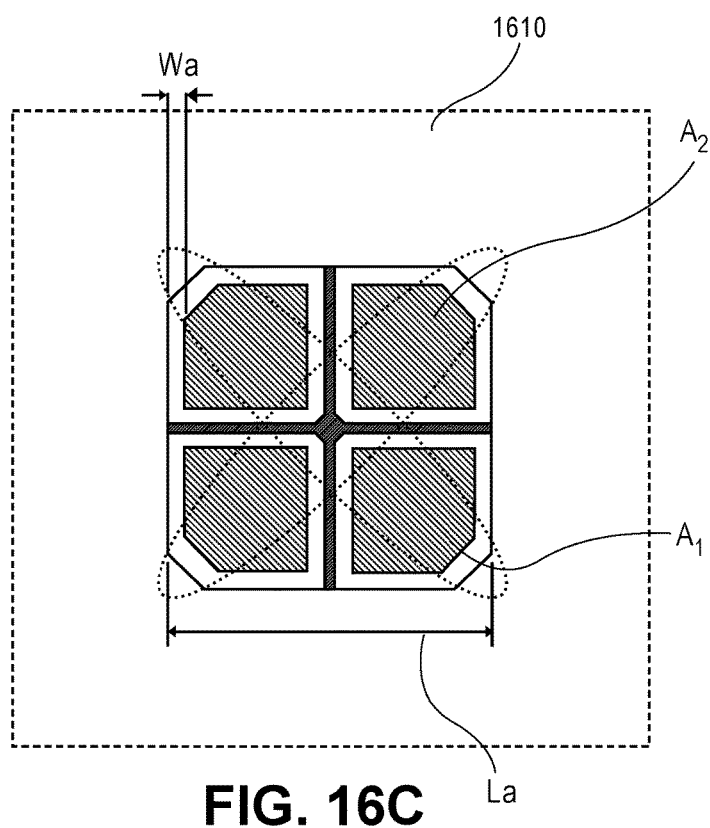
Figure 16E:
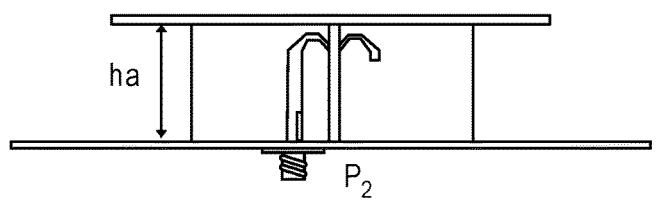
Figure 16F:
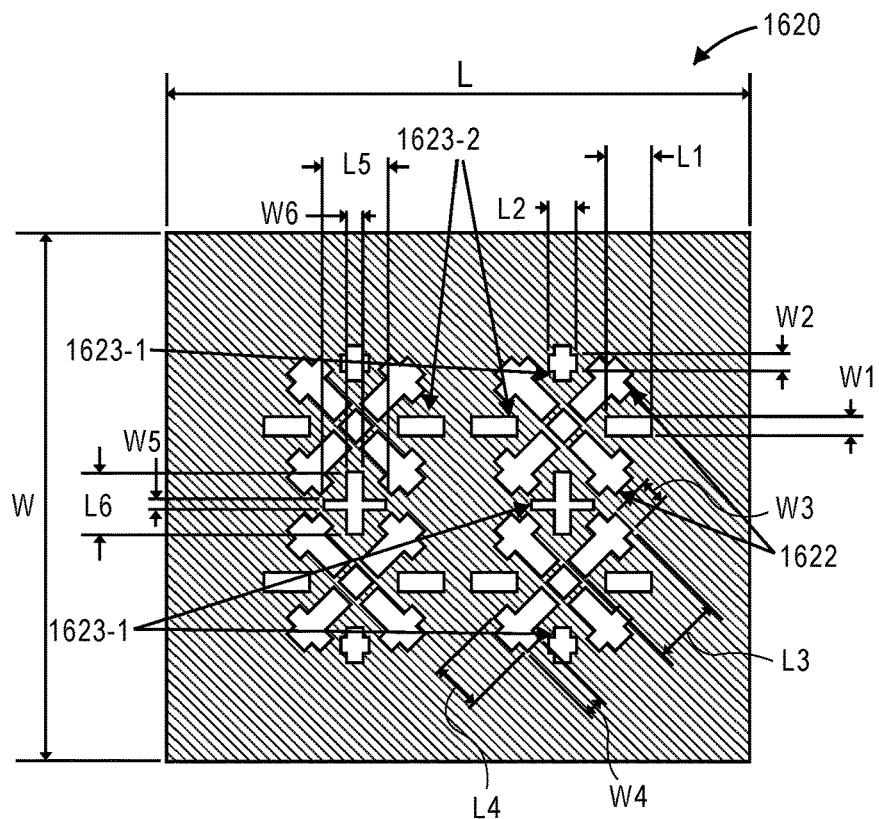
FIG. 16F is a top view of the ADS of FIG. 16A.

FIGS. 16A-16F illustrate a two-dimensional dual polarized 2 by 2 planar dipole array with 8 elements operating in the frequency band from 3.3 to 3.8 GHz. FIG. 16A illustrates antenna array 1610 together with ADS 1620. FIG. 16B is a top view of the array, specifically illustrating neighboring antenna element units 1602 and 1603 separated by center-to-center distance D1. FIGS. 16C-E show a top and side views of one antenna unit. Each antenna unit consists of two perpendicularly polarized dipole antennas, one of which is oriented in 45° and the other in 135°, with respect to the horizontal line. FIG. 16F shows metal reflection patches on the ADS for the 2 by 2 dipole array, including neighboring segmented patches 1622 and 1628, which overlay antenna element units 1602 and 1603. These patches have dimensions W1, W2, W3, W4, W5, L1, L2, L3, L4, L5, and L6 as shown.

Figure 17:
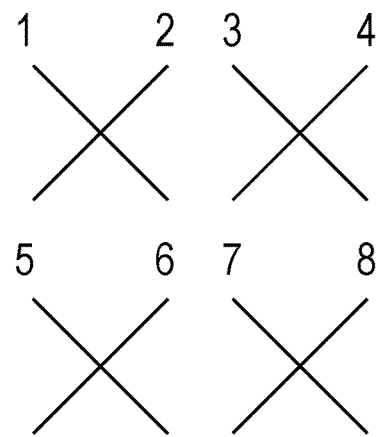
FIG. 17 is a schematic illustration of number assignments for the eight antenna elements of the antenna array of FIG. 16A.

FIG. 17 is a number assignment of the 8 antenna elements for the antenna array of FIGS. 16A-16F.

This small-scale array antenna is an appropriate reflection of a large-scale M-MIMO array antenna as the decoupling solution can be scaled up to a uniform M-MIMO array with a large number of antenna elements of the same type. The two diamond ring shaped arms of each dipole antenna with the width of Wa are printed on a substrate. The substrate is with dielectric constant of 2.6, loss tangent of 0.001 and thickness of 1.0 mm. Each dipole is fed by a microstrip line balun, which is installed vertically to each planar dipole.

The horizontal and vertical center-to-center distances between two antenna units are D1 and D2, which are 45 mm and 60 mm, respectively. The two perpendicular balun circuits also play the role of mechanical supporter to the two dual polarized antennas. The ports of antennas are located on the other side of the ground plane. Other major dimensions of the array are listed in Table II.

TABLE II

DIMENSIONS OF THE 2 BY 2 DIPOLE ARRAY IN MM

| La | ha | Wa | D1 | D2 | Lg | Wg | H |
|---|---|---|---|---|---|---|---|
| 36.5 | 12.5 | 2 | 45 | 60 | 180 | 165 | 25 |

FIG. 16F illustrates the metal reflection patches printed on the ADS substrate for the 2 by 2 array. The substrate used for the ADS is the same substrate for the printed dipole antennas and the balun circuits. The ADS consists of 8 primary reflectors and two groups of secondary reflectors. Each of primary reflectors is oriented in-line with and on the top of the corresponding dipole, such as segmented conductive patch 1622 over antenna element unit 1602. A primary reflector is made of a broken or segmented metal strip along the direction of the electric field polarization of the dipole underneath, and it is arranged symmetrically with respect to the center of the dipole antenna. Therefore, two primary reflectors for the two dual polarized dipoles in the same antenna unit are crossly arranged to maintain the symmetry of the antenna unit.

An important consideration to adopt a broken patch reflector for a primary reflector is to minimize the perturbation to the radiation patterns and the deterioration of the matching condition of the corresponding dipole antenna underneath. Primary reflectors 1622 are designed to cancel the strongest mutual co-polarized coupling between two adjacent element units in this two-dimensional array. Because D2>D1 in this example, the mutual coupling between two horizontal adjacent elements, for example elements 1 and 3, will be stronger than that of two vertical adjacent elements.

Two groups of secondary reflector patches 1623-1 and 1623-2 are used in the ADS design. Secondary reflector patches 1623-1 in group 1 are introduced to create a small amount of reflected waves in the cross-polarized components to cancel the mutual coupling between two cross polarized adjacent elements, such as the coupling between elements 1 and 4 and that between elements 2 and 3. They are called secondary reflector patches because the reflected wave is at a much smaller level than that of the mutual coupling between two co-polarized components.

The secondary reflector patches 1623-2 play a role of 'fine tuning,' Their sizes are smaller than that of the primary reflector patches. Group 2 secondary reflector patches 1623-2 are introduced to adjust the reflected waves from the primary reflector patches above two vertically adjacent elements of co-polarization. This may be needed because the mutual coupling between elements 1 and 3 is different from that between elements 1 and 5. To maintain the balance between two cross-polarized dipole antennas in the same antenna unit, some auxiliary patches of the secondary reflectors may be added symmetrically about the antenna unit. The detailed dimensions of the ADS are given in Table III.

TABLE III

DIMENSIONS OF ADS FOR THE 2 BY 2 DIPOLE ARRAY IN MM

| L | L1 | L2 | L3 | L4 | L5 | L6 |
|---|---|---|---|---|---|---|
| 170 | 9.5 | 8.5 | 20 | 14 | 18 | 18.5 |
| W | W1 | W2 | W3 | W4 | W5 | W6 |
| 155 | 5 | 3 | 7 | 4 | 3 | 5 |

FIGS. 18A-18E present measured S-parameters of certain ports. Not all mutual coupling S-parameters are presented due to the symmetry of the 2 by 2 array.

Figure 18A:
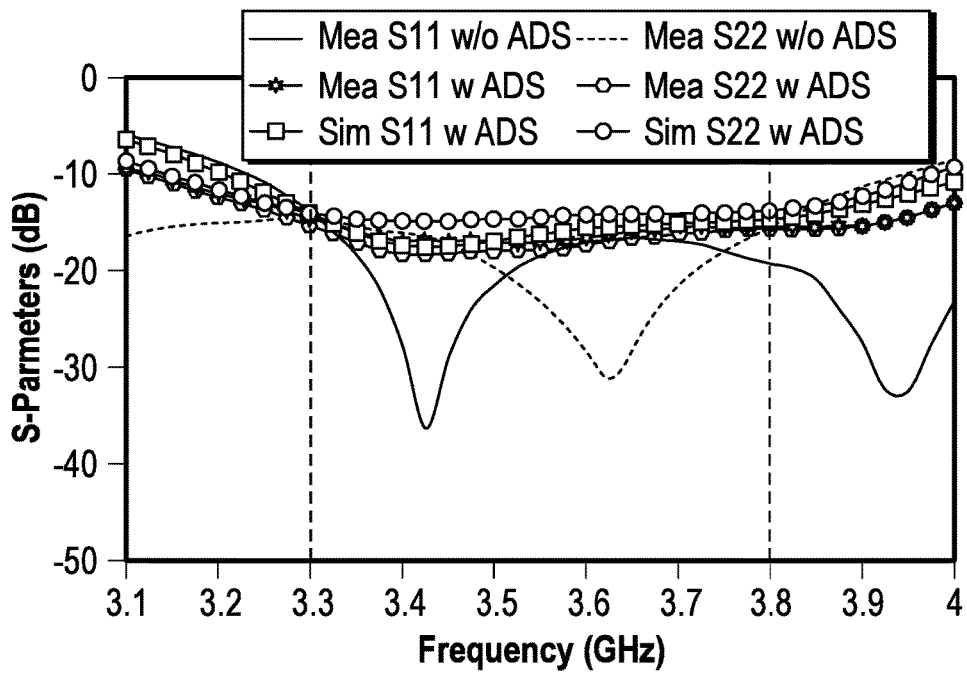
FIG. 18A charts S-parameters of the antenna array of FIG. 16A with and without the ADS between antenna elements.

FIG. 18A shows the return losses (RL) at port $P_1$ and port $P_2$ of the array with and without the ADS. It is seen that after applying the ADS, the return losses remain at 15 dB or better across the whole working frequency band from 3.3 to 3.8 GHz.

Figure 18B:
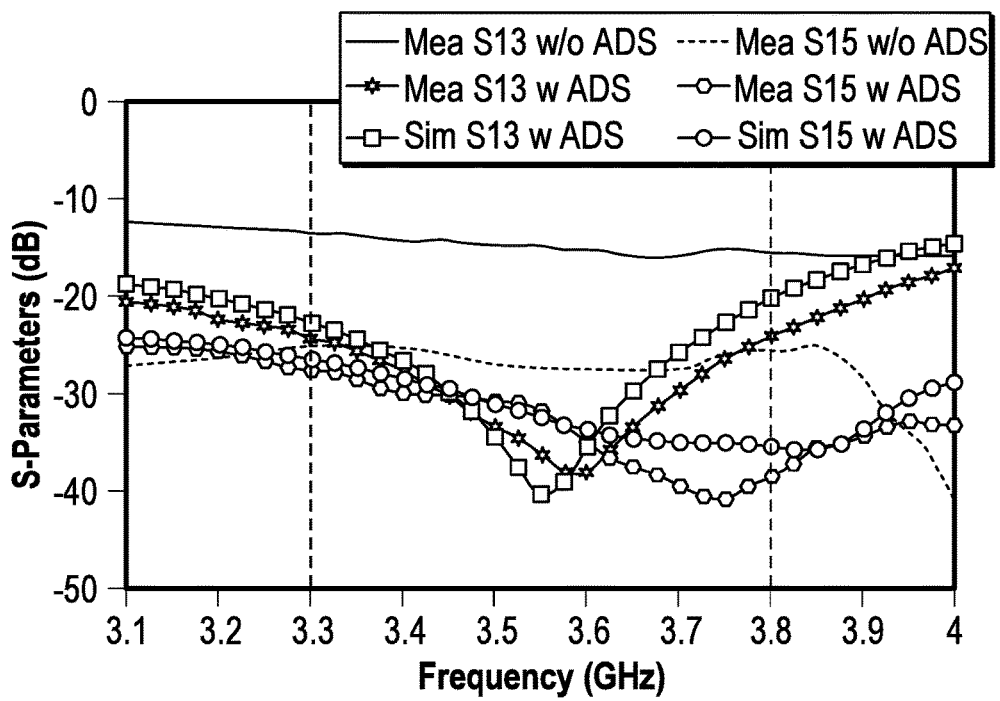
FIG. 18B charts S-parameters of the antenna array of FIG. 16A with and without the ADS between antenna elements.

FIG. 18B shows the mutual couplings between two adjacent elements of the same polarization in both horizontal and vertical directions, i.e. $S_{13}$ and $S_{15}$. It is seen that with the ADS, $S_{13}$ is reduced from about −14 dB to −25 dB or lower, and $S_{15}$ is improved from −26 dB to −28 dB or lower.

Figure 18C:
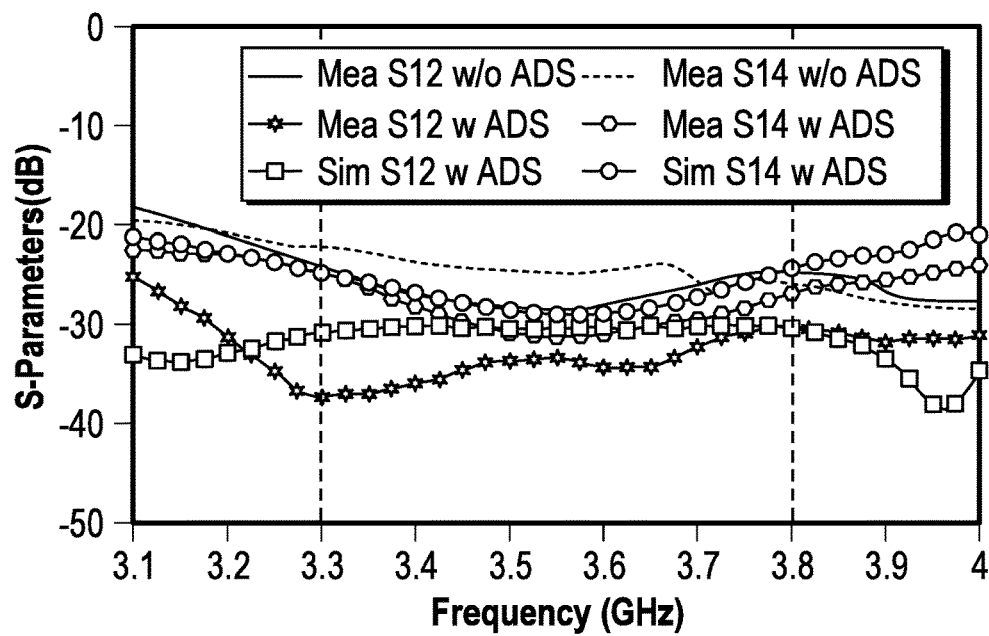
FIG. 18C charts S-parameters of the antenna array of FIG. 16A with and without the ADS between antenna elements.

FIG. 18C shows the coupling between two cross-polarized elements in the same unit, for example $S_{12}$. It is seen that the mutual coupling between two cross-polarized antenna elements is also improved to below −30 dB although the original coupling without the ADS is about −25 dB. The coupling between two adjacent dipole elements with cross polarization, for example $S_{14}$, is difficult to control when the two antenna units are close to each other. This is because the coupling is strongly determined by the shortest distance of the ends of the two concerned dipole elements.

Figure 18D:
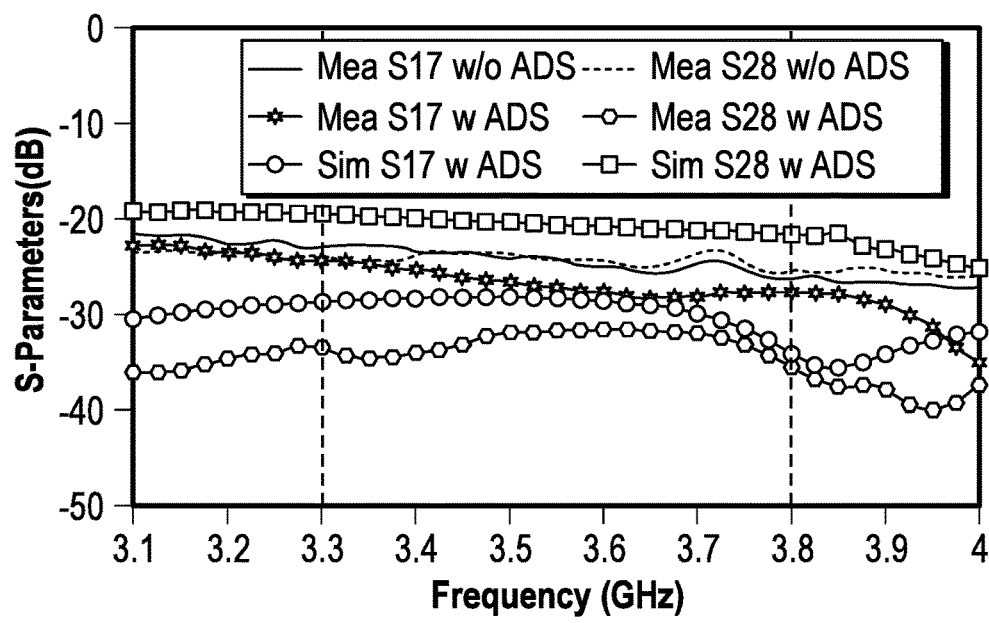
FIG. 18D charts S-parameters of the antenna array of FIG. 16A with and without the ADS between antenna elements.

FIGS. 18C and 18D show that by introducing group 1 secondary reflectors, both $S_{14}$ and $S_{23}$ are reduced from −23 dB to −25 dB and from −25 dB to −30 dB or lower, respectively. Usually, the mutual coupling between two co-axial and co-linear dipole elements, for example $S_{17}$, and that between two far away elements of co-polarization, for example $S_{28}$, are inherently low before applying the ADS. There are no specific considerations to deal with these mutual couplings. However, with other major mutual couplings reduced, as demonstrated in FIG. 18D, these weak couplings are also reduced.

Figure 18E:
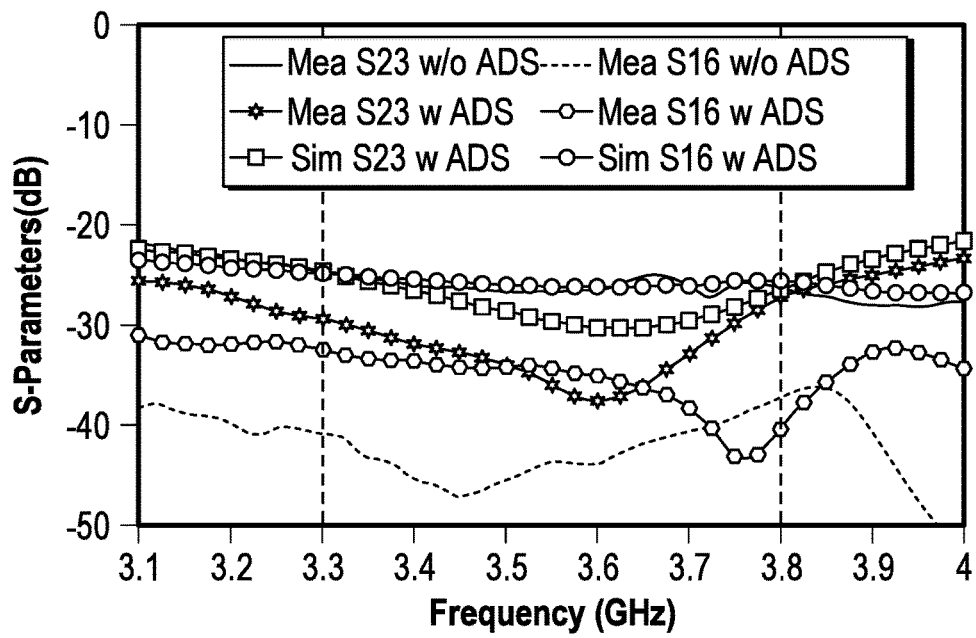
FIG. 18E charts S-parameters of the antenna array of FIG. 16A with and without the ADS between antenna elements.
Figure 19A:
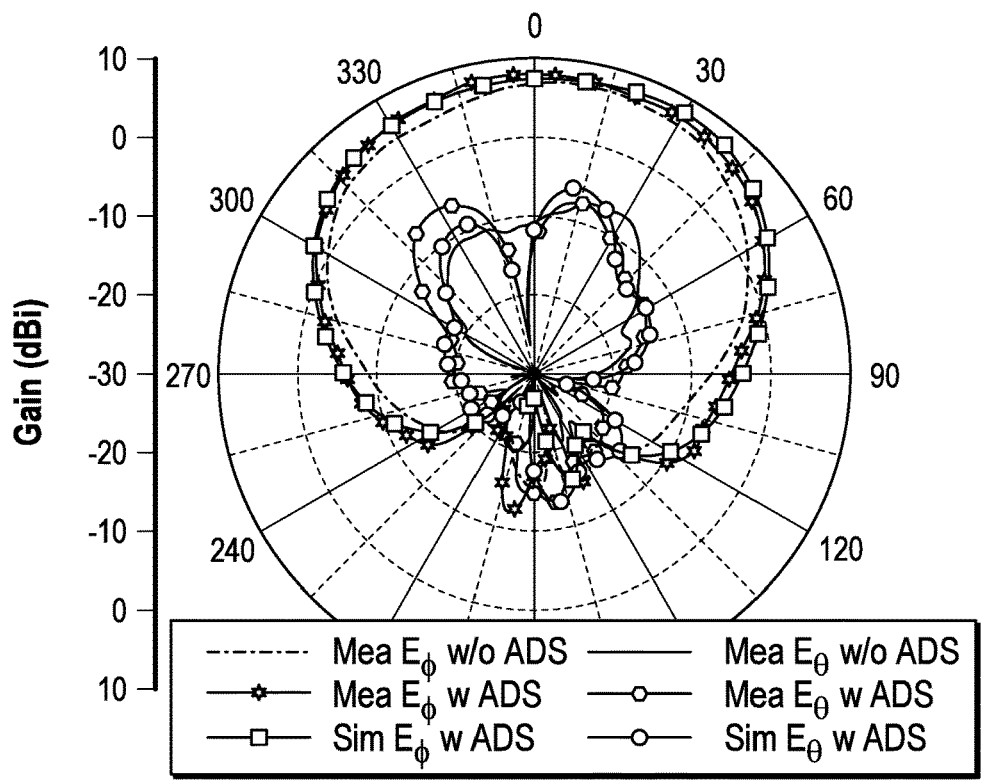
FIG. 19A charts H-plane active radiation patterns of element 1 of the antenna array of FIG. 16A with and without ADS.
Figure 19B:
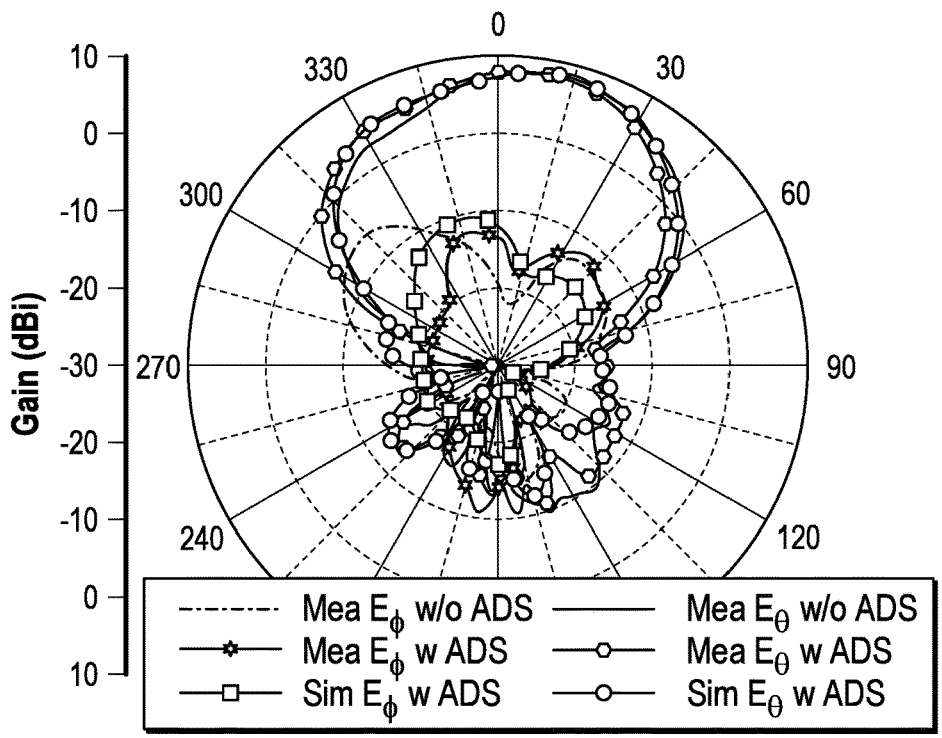
FIG. 19B charts E-plane active radiation patterns of element 1 of the antenna array of FIG. 16A with and without ADS.
Figure 19C:
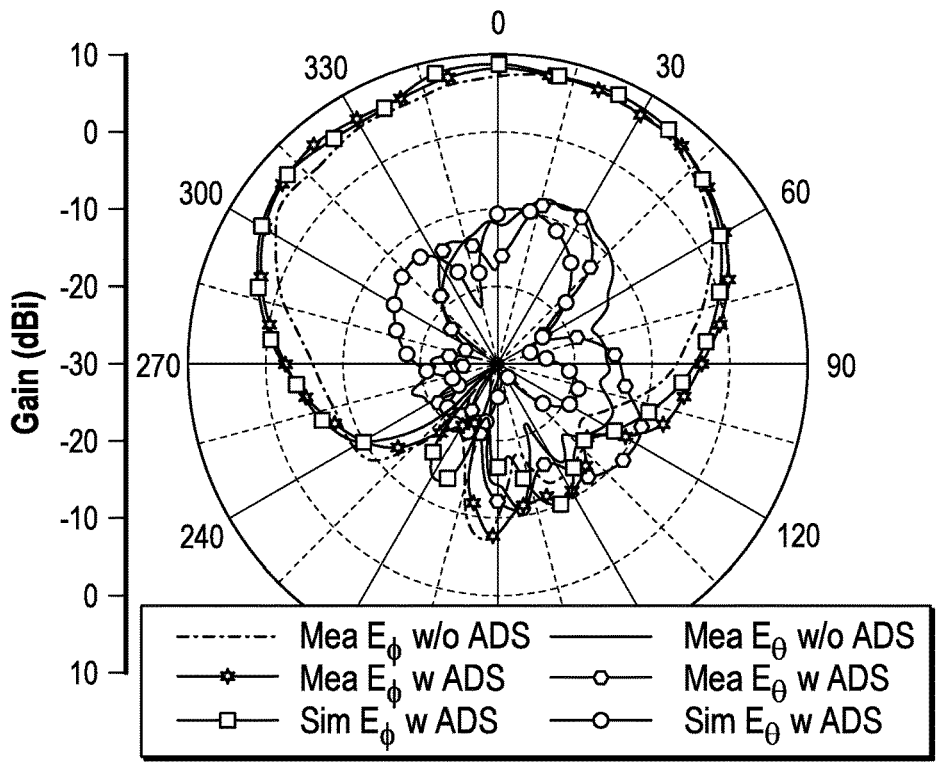
FIG. 19C charts H-plane active radiation patterns of element 2 of the antenna array of FIG. 16A with and without ADS.
Figure 19D:
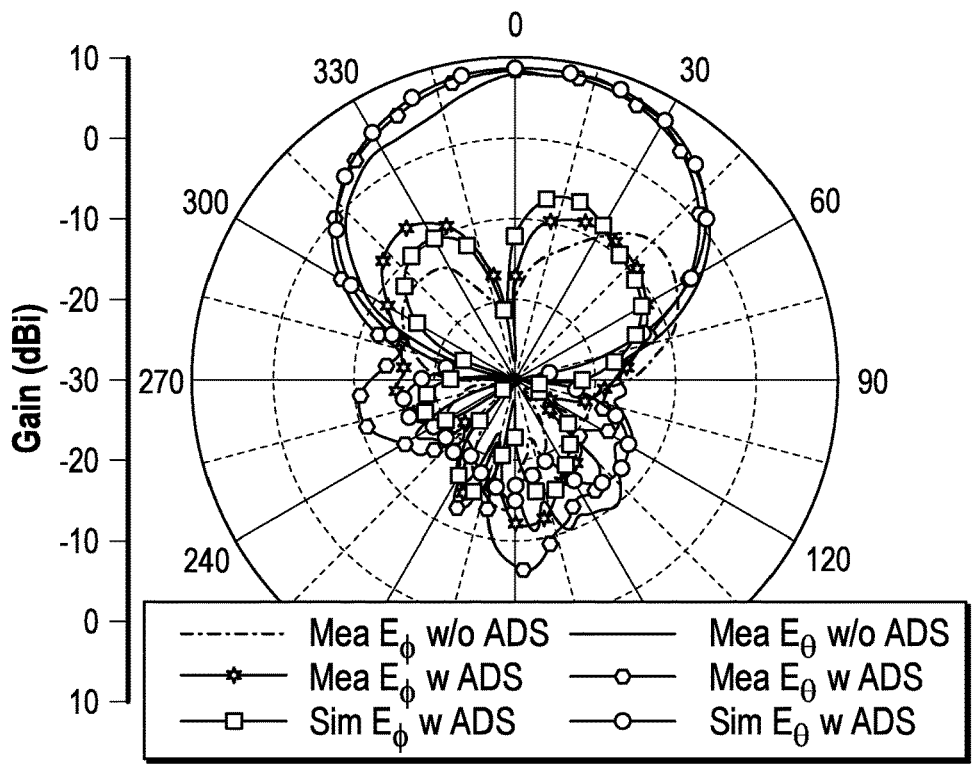
FIG. 19D charts E-plane active radiation patterns of element 2 of the antenna array of FIG. 16A with and without ADS.
Figure 19E:
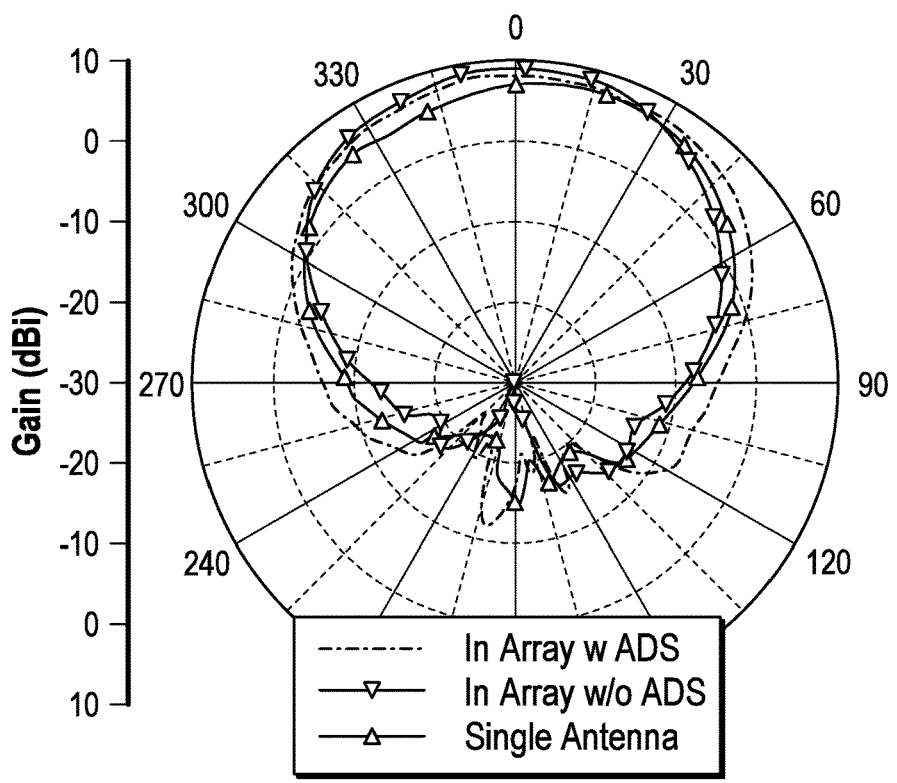
FIG. 19E charts H-plane active radiation patterns of element 1 of the antenna array of FIG. 16A with, without ADS, and without ADS but only with the presence of element 1 and element 2 in the array.

FIG. 18E shows the mutual coupling between elements 1 and 6 is the weakest among others due to cross polarization and a long separation distance. With installation of the ADS, the coupling is changed from −40 dB to −30 dB, which is far below other mutual couplings and should not be a concern. In FIGS. 18A-18E, the EM simulated S-parameters for the array with the ADS are also provided, showing a more conservative estimation.

One of attractive attributes of the ADS is its radiation pattern reshaping capability. It is known that due to the existence of the mutual couplings, the radiation patterns of each antenna element in an array will be distorted. This issue can be alleviated after an ADS is applied.

FIGS. 19A-19E show the radiation patterns of antenna elements 1 and 2. The measured radiation patterns at 3.5 GHz in H- and E-planes with and without the ADS are presented for comparison. By inspecting the radiation patterns, the following observations can be obtained: 1) the beam widths of both H- and E-plane radiation patterns of the major field component for an antenna element with the ADS are about the same as those of the element without the ADS—but are with less distortion due to the reduction of mutual couplings between adjacent elements; 2) the forward/backward radiation ratio for the elements with and without the ADS is about the same; and 3) a good cross-polarization ratio can be retained, i.e. better than 18 dB in axial direction and better than 10 dB in ±60°.

In measuring the radiation patterns of the antenna element, other antenna ports are terminated by 50Ω load. The measured (Mea) radiation patterns of the array antenna with the ADS are also verified by EM simulated (Sim) patterns at 3.5 GHz as shown in FIGS. 19A-19E. Excellent correlation can be observed.

Figure 20B:
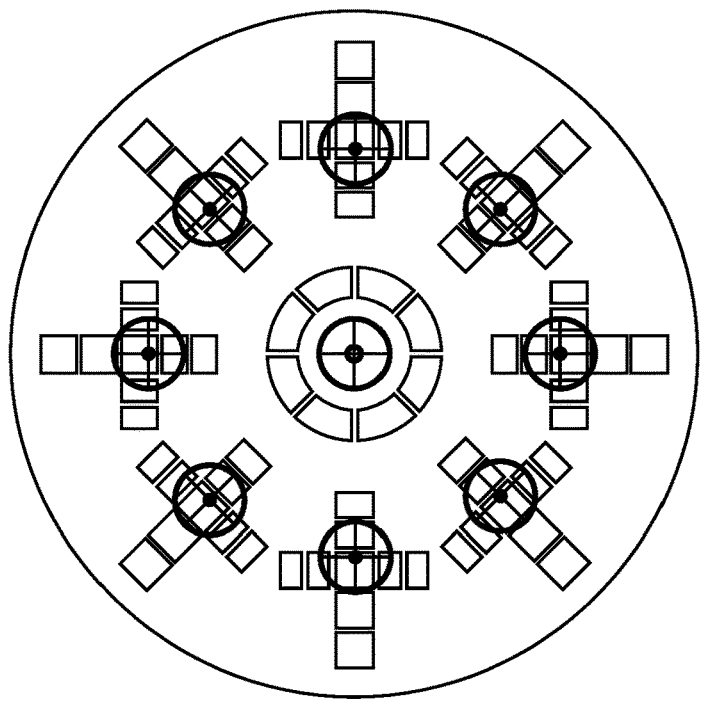
FIG. 20B illustrates a top view of an ADS overlaying the quadrifilar helix circularly polarized antenna array of FIG. 20A.
Figure 20A:
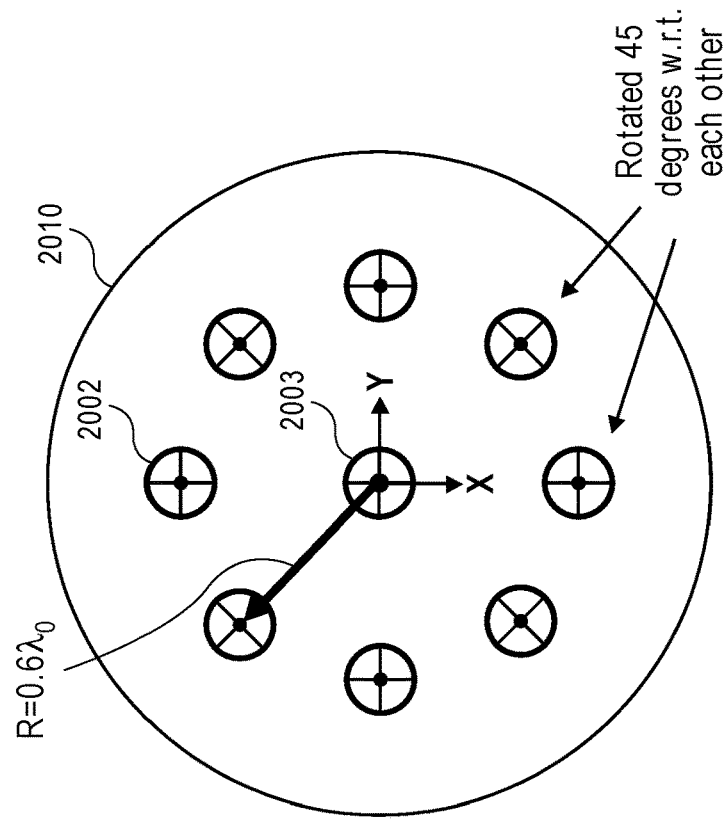
FIG. 20A illustrates a top view of a quadrifilar helix circularly polarized antenna array.
Figure 20C:
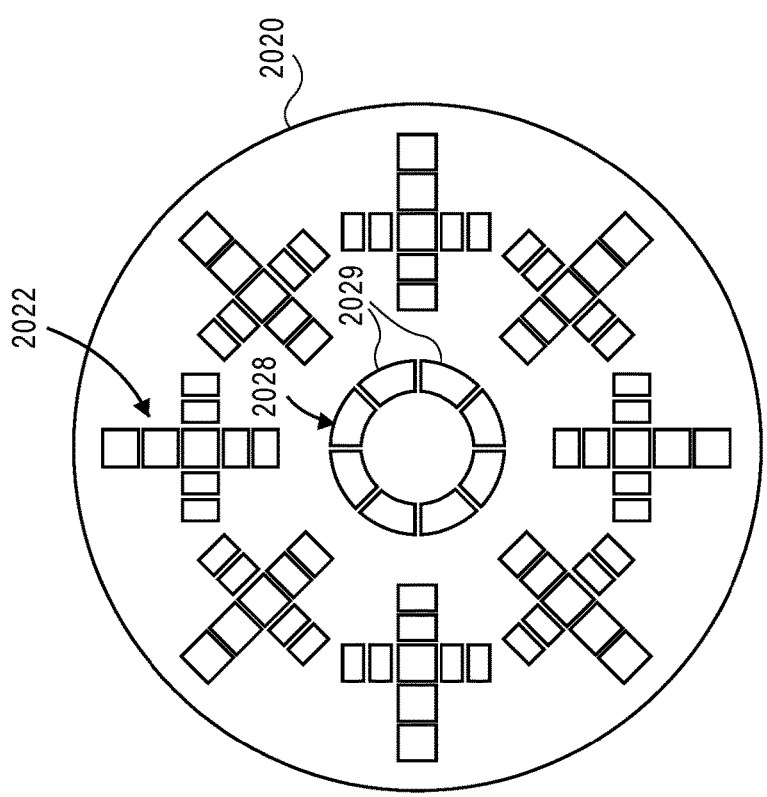
FIG. 20C illustrates a top view of the ADS of FIG. 20B.

FIGS. 20A-20C illustrate quadrifilar helix circularly polarized antenna array 2010 with ADS 2020 overlaying it. Antenna element 2002 of antenna array 2010 is directly overlaid by segmented cross patch 2022. Segmented ring patch 2028, comprised of curved rectangle patches 2029, overlay central antenna element 2003.

Figure 21:
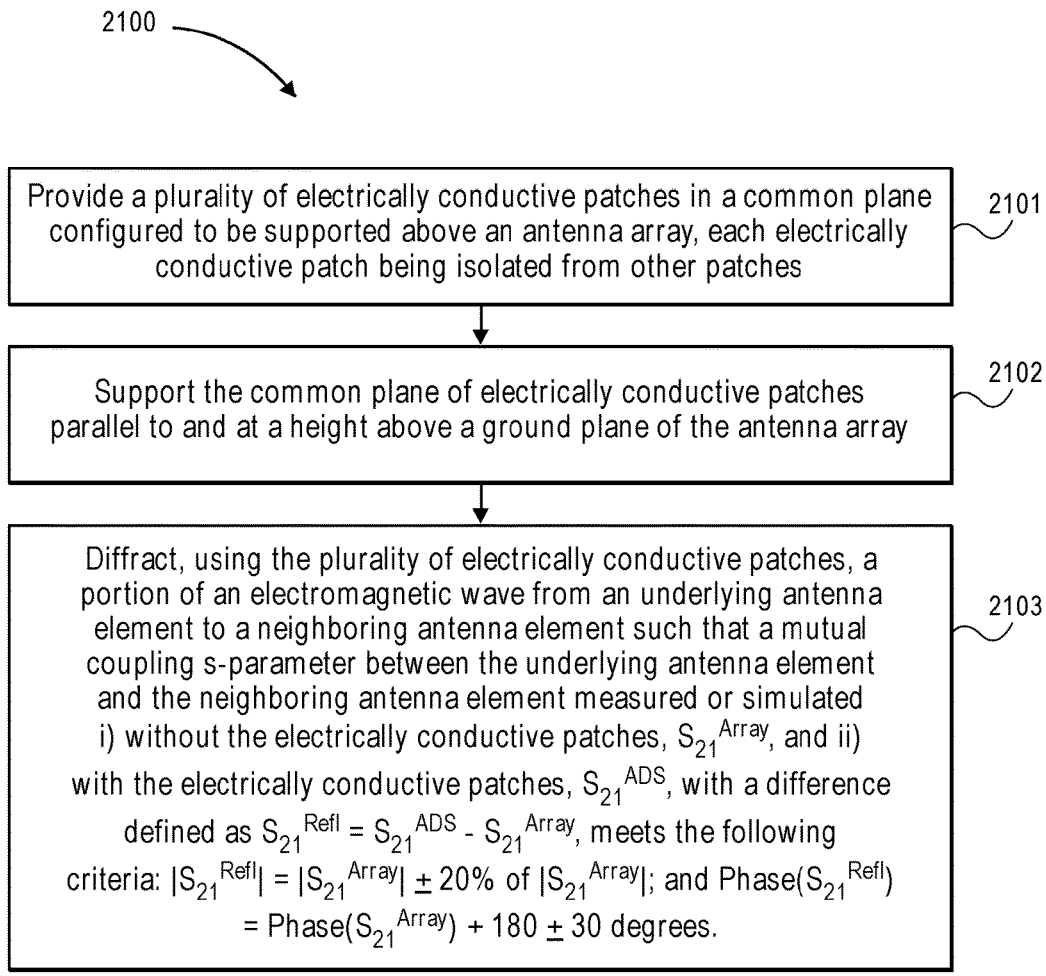
FIG. 21 is a flowchart illustrating a process according to an embodiment of the present disclosure.

FIG. 21 is a flowchart illustrating process 2100 according to an embodiment of the present disclosure. In operation 2101, a plurality of electrically conductive patches is provided in a common plane configured to be supported above an antenna array, each electrically conductive patch being isolated from other patches. In operation 2102, the common plane of electrically conductive patches is supported parallel to and at a height above a ground plane of the antenna array. In operation 2103, a portion of an electromagnetic wave is diffracted, using the plurality of electrically conductive patches, to a neighboring antenna element such that a mutual coupling s-parameter between the underlying antenna element and the neighboring antenna element measured or simulated i) without the electrically conductive patches, $S_{21}^{Array}$, and ii) with the electrically conductive patches, $S_{21}^{ADS}$, with a difference defined as $S_{21}^{Refl}=S_{21}^{ADS}-S_{21}^{Array}$, meets the following criteria: $|S_{21}^{Refl}|=|S_{21}^{Array}|\pm20\%$ of $|S_{21}^{Array}|$; and $\text{Phase}(S_{21}^{Refl})=\text{Phase}(S_{21}^{Array})+180\pm30$ degrees.

The above description only refers to some embodiments of the present application and explains the applicable technical principles. It will be appreciated by those skilled in the art that the scope of the claimed solutions as disclosed in the present application are not limited to those consisted of particular combinations of features described above, but should be cover other solutions formed by any combination of features from the foregoing or an equivalent thereof without departing from the inventive concepts, for example, a solution formed by replacing one or more features as discussed in the above with one or more features with similar functions disclosed but not limited to the present application.

What is claimed is:

1. A near-field apparatus for reducing mutual couplings between antenna elements in an antenna array, the antenna array having a nominal operating range of frequencies and associated wavelengths, the apparatus comprising:

a plurality of electrically conductive patches in a common plane configured to be supported above the antenna array, each electrically conductive patch being isolated from other patches and having a width of less than 50% of an underlying antenna element and a longest dimension no greater than 0.3 of a shortest wavelength of the nominal operating range; and a standoff structure configured to hold the common plane of electrically conductive patches parallel to and at a height from a ground plane of the antenna array, wherein at least one electrically conductive patch of the plurality of electrically conductive patches is sized to diffract a portion of an electromagnetic wave from an underlying antenna element to a neighboring antenna element such that a mutual coupling s-parameter between the underlying antenna element and the neighboring antenna element measured or simulated i) without the electrically conductive patches, $S_{21}^{Array}$, and ii) with the electrically conductive patches, $S_{21}^{ADS}$, with a difference defined as $S_{21}^{Refl}=S_{21}^{ADS}-S_{21}^{Array}$, meets the following criteria:

$|S_{21}^{Refl}|$ is in a range of $|S_{21}^{Array}|\pm20\%$ of $|S_{21}^{Array}|$; and $\text{Phase}(S_{21}^{Refl})$ is in a range of $\text{Phase}(S_{21}^{Array})+180\pm30$ degrees.

2. The apparatus of claim 1 wherein the height or a dimension of each electrically conductive patch is selected to minimize a difference between $|S_{21}^{Refl}|$ and $|S_{21}^{Array}|$.

3. The apparatus of claim 1 wherein the height or a dimension of each electrically conductive patch is selected to minimize a difference between Phase($S_{21}^{Refl}$) and Phase($S_{21}^{Array}$)+180 degrees.

4. The apparatus of claim 1 wherein the height of the common plane of electrically conductive patches over the ground plane of the antenna array is between 0.25 λc and 0.4 λc, wherein λc is an electromagnetic wavelength corresponding to a center frequency of the antenna array.

5. The apparatus of claim 1 further comprising:
a dielectric substrate upon which the plurality of electrically conductive patches are formed.

6. The apparatus of claim 1 wherein the plurality of electrically conductive patches includes shapes having right angles and an even number of parallel sides is selected from the group consisting of a rectangle, a plus, a cross, a tee, an I, a #, an ell, a U, and a curved rectangle.

7. The apparatus of claim 1 wherein a subset of the plurality of right-angled, electrically conductive patches forms a larger, symmetric shape selected from the group consisting of a segmented rectangle, a segmented plus, a segmented frame, and a segmented ring.

8. The apparatus of claim 1 wherein each electrically conductive patch is centered over an underlying antenna element.

9. The apparatus of claim 1 wherein each electrically conductive patch is centered between two underlying antenna elements.

10. The apparatus of claim 1 further comprising:
the antenna array.

11. The apparatus of claim 10 wherein the antenna array is selected from the group consisting of a linear patch antenna array, a dual polarized linear dipole antenna array, and a patch or quadrifilar helix circularly polarized antenna array.

12. The apparatus of claim 1 wherein the plurality of electrically conductive patches is a first plurality of patches, the apparatus further comprising:
a second plurality of electrically conductive patches in the common plane, each of the second plurality of electrically conductive patches having an even number of sides, right angles at each edge, a width of less than 50% of an underlying antenna element, and a longest dimension no greater than 0.3 of a shortest wavelength of the nominal operating range,
wherein at least one electrically conductive patch of the second plurality of electrically conductive patches is sized to diffract a portion of an electromagnetic wave from an underlying antenna to a cross polarized neighboring antenna element.

13. The apparatus of claim 1, wherein the plurality of electrically conductive patches form a non-periodic or asymmetrical pattern.

14. A near-field apparatus for reducing mutual couplings between antenna elements in an antenna array, the antenna array having a nominal operating range of frequencies and associated wavelengths, the apparatus comprising:
a plurality of electrically conductive patches in a common plane configured to be supported above the antenna array, each electrically conductive patch being isolated from other patches; and
a standoff structure configured to hold the common plane of electrically conductive patches parallel to and at a height above a ground plane of the antenna array,
wherein the height of the common plane of electrically conductive patches over the ground plane of the antenna array is between 0.25 λc and 0.4 λc, wherein λc is an electromagnetic wavelength corresponding to a center frequency of the antenna array,
wherein at least one electrically conductive patch of the plurality of electrically conductive patches is sized to diffract a portion of an electromagnetic wave from an underlying antenna element to a neighboring antenna element such that a mutual coupling s-parameter between the underlying antenna element and the neighboring antenna element measured or simulated i) without the electrically conductive patches, $S_{21}^{Array}$, and ii) with the electrically conductive patches, $S_{21}^{ADS}$, with a difference defined as $S_{21}^{Refl} = S_{21}^{ADS} - S_{21}^{Array}$, meets the following criteria:
$|S_{21}^{Refl}|$ is in a range of $|S_{21}^{Array}| \pm 20\%$ of $|S_{21}^{Array}|$; and
Phase($S_{21}^{Refl}$) is in a range of Phase($S_{21}^{Array}$)+180±30 degrees.

15. The apparatus of claim 14 wherein the height or a dimension of each electrically conductive patch is selected to minimize a difference between $|S_{21}^{Refl}|$ and $|S_{21}^{Array}|$.

16. The apparatus of claim 14 wherein the height or a dimension of each electrically conductive patch is selected to minimize a difference between Phase($S_{21}^{Refl}$) and Phase($S_{21}^{Array}$)+180 degrees.

17. The apparatus of claim 14 wherein each electrically conductive patch has a width of less than 50% of an underlying antenna element and a longest dimension no greater than 0.3 of a shortest wavelength of the nominal operating range.

18. The apparatus of claim 14 further comprising:
a dielectric substrate upon which the plurality of electrically conductive patches are formed.

19. The apparatus of claim 14 wherein the plurality of electrically conductive patches includes shapes having right angles and an even number of parallel sides is selected from the group consisting of a square, a rectangle, a plus, a cross, an uppercase T, an I, a #, an L, a U, and a curved rectangle.

20. The apparatus of claim 14 wherein a subset of the plurality of right-angled, electrically conductive patches forms a larger, symmetric shape selected from the group consisting of a segmented square, a segmented rectangle, a segmented plus, a segmented frame, and a segmented ring.

21. The apparatus of claim 14 wherein each electrically conductive patch is centered over an underlying antenna element.

22. The apparatus of claim 14 wherein each electrically conductive patch is centered between two underlying antenna elements.

23. The apparatus of claim 14 further comprising:
the antenna array.

24. The apparatus of claim 10 wherein the antenna array is selected from the group consisting of a linear patch antenna array, a dual polarized linear dipole antenna array, and a patch or quadrifilar helix circularly polarized antenna array.

25. The apparatus of claim 14 wherein the plurality of electrically conductive patches is a first plurality of patches, the apparatus further comprising:
a second plurality of electrically conductive patches in the common plane, each of the second plurality of electrically conductive patches having an even number of sides, right angles at each edge, a width of less than 50% of an underlying antenna element, and a longest dimension no greater than 0.3 of a shortest wavelength of the nominal operating range, wherein at least one electrically conductive patch of the second plurality of electrically conductive patches is sized to diffract a portion of an electromagnetic wave from an underlying antenna to a cross polarized neighboring antenna element.

26. The apparatus of claim 14, wherein the plurality of electrically conductive patches form a non-periodic or asymmetrical pattern.

27. A method for reducing mutual couplings of antenna elements in an antenna array, the antenna array having a nominal operating range of frequencies and associated wavelengths, the method comprising:
providing a plurality of electrically conductive patches in a common plane configured to be supported above the antenna array, each electrically conductive patch being isolated from other patches;
supporting the common plane of electrically conductive patches parallel to and at a height above a ground plane of the antenna array; and
diffracting, using the plurality of electrically conductive patches, a portion of an electromagnetic wave from an underlying antenna element to a neighboring antenna element such that a mutual coupling s-parameter between the underlying antenna element and the neighboring antenna element measured or simulated i) without the electrically conductive patches, $S_{21}^{Array}$, and ii) with the electrically conductive patches, $S_{21}^{ADS}$, with a difference defined as $S_{21}^{Refl} = S_{21}^{ADS} - S_{21}^{Array}$, meets the following criteria:
$|S_{21}^{Refl}|$ is in a range of $|S_{21}^{Array}| \pm 20\%$ of $|S_{21}^{Array}|$; and Phase($S_{21}^{Refl}$) is in a range of Phase($S_{21}^{Array}$)+180±30 degrees.

28. The method of claim 27 wherein the height or a dimension of each electrically conductive patch is selected to minimize a difference between $|S_{21}^{Refl}|$ and $|S_{21}^{Array}|$.

29. The method of claim 27 wherein the height or a dimension of each electrically conductive patch is selected to minimize a difference between Phase($S_{21}^{Refl}$) and Phase($S_{21}^{Array}$)+180 degrees.

30. The method of claim 27 wherein each electrically conductive patch has a width of less than 50% of an underlying antenna element and a longest dimension no greater than 0.3 of a shortest wavelength of the nominal operating range.

31. The method of claim 27 wherein the height of the common plane of electrically conductive patches over the ground plane of the antenna array is between 0.25 λc and 0.4 λc, wherein λc is an electromagnetic wavelength corresponding to a center frequency of the antenna array.

* * * * *